Nov. 1, 1932.  R. W. CANFIELD  1,885,682
APPARATUS FOR FORMING GLASSWARE
Filed July 13, 1929  12 Sheets-Sheet 3
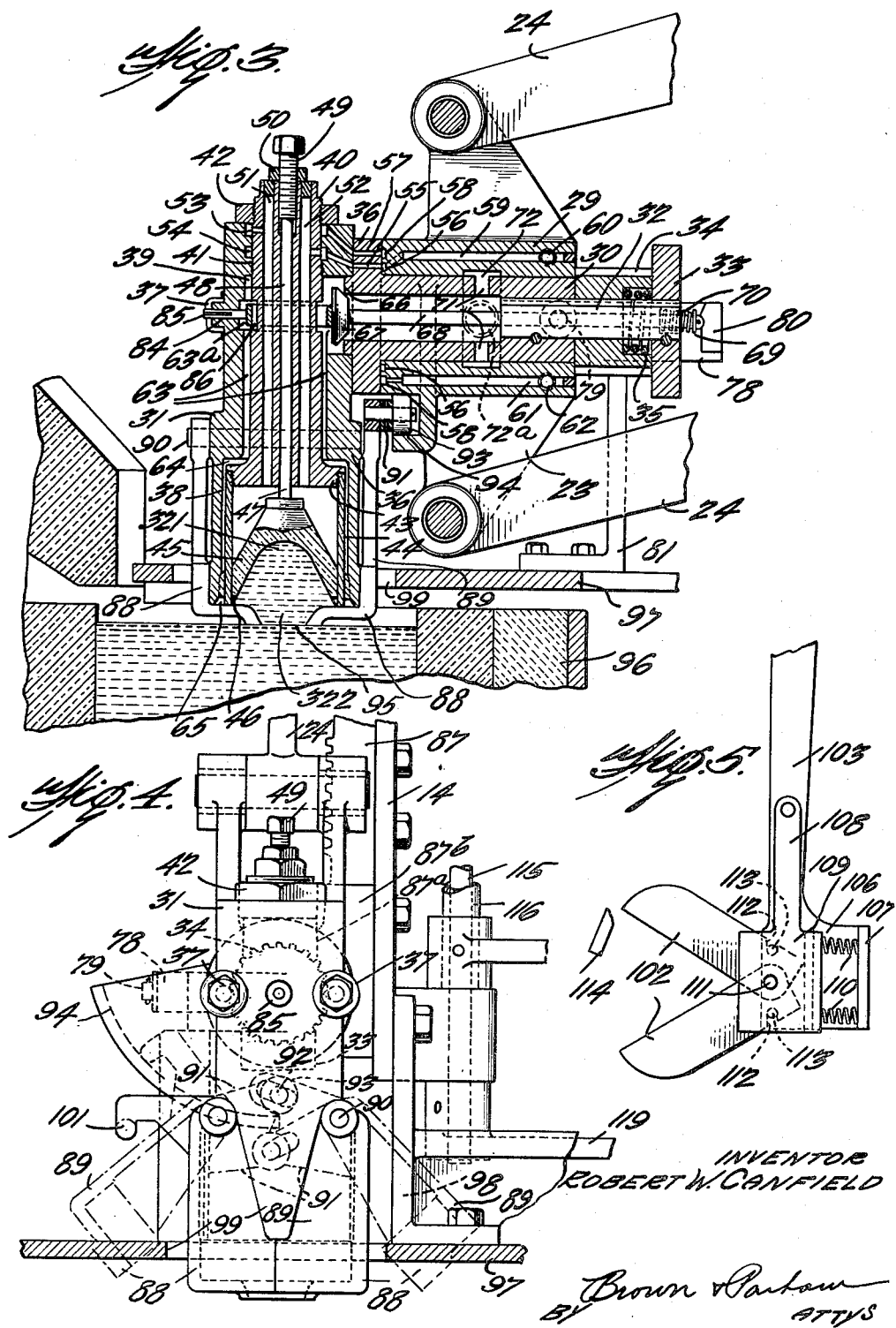

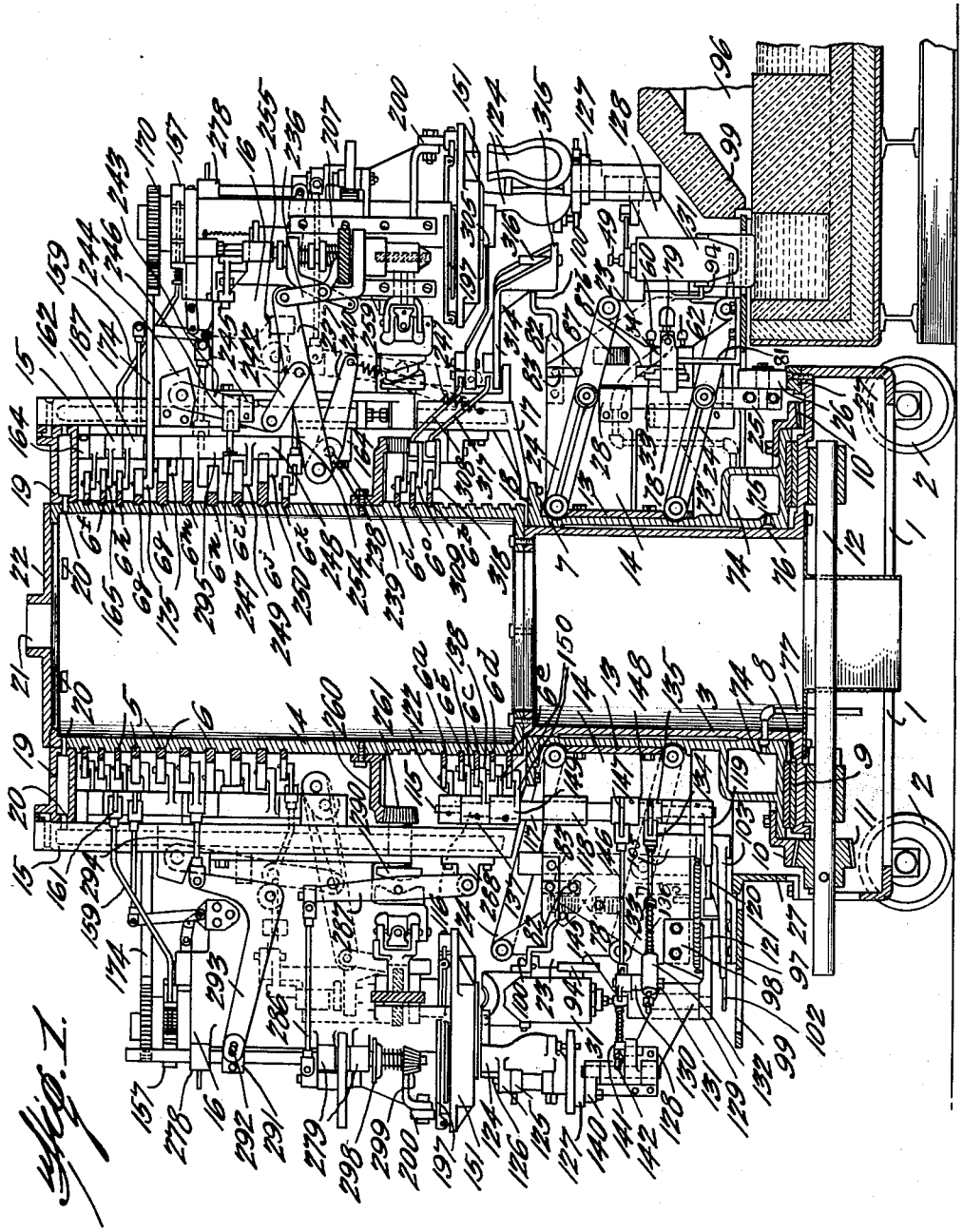

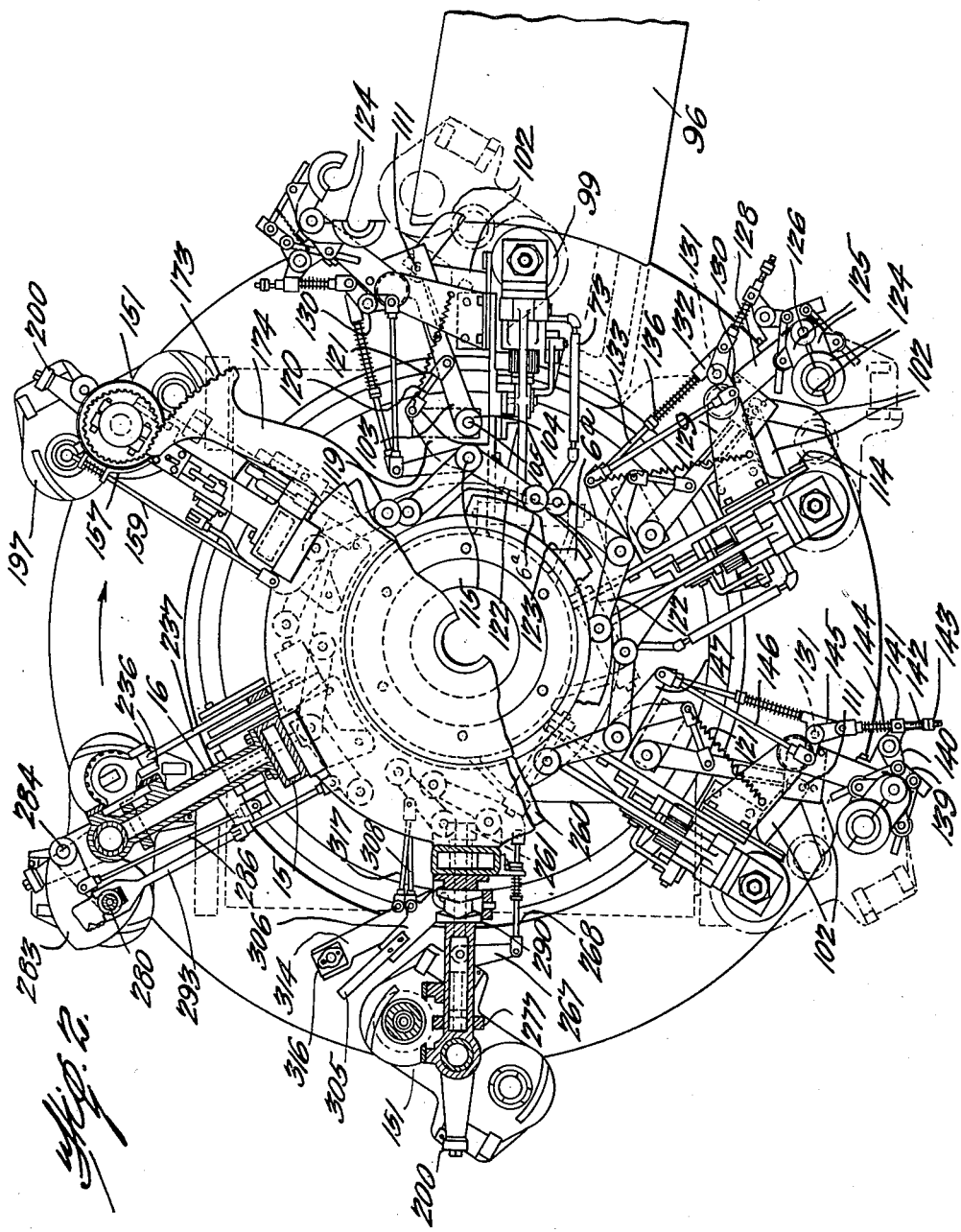

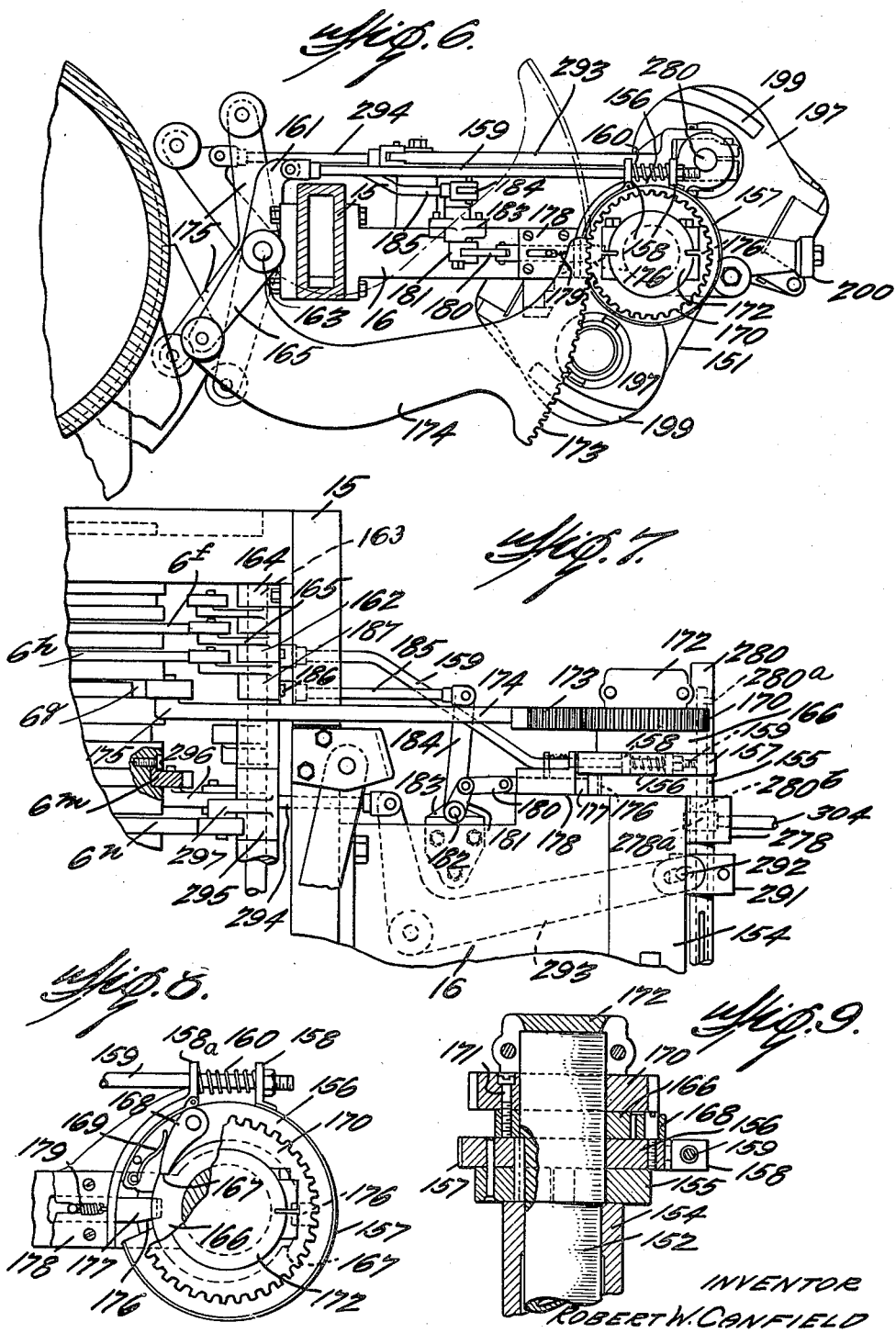

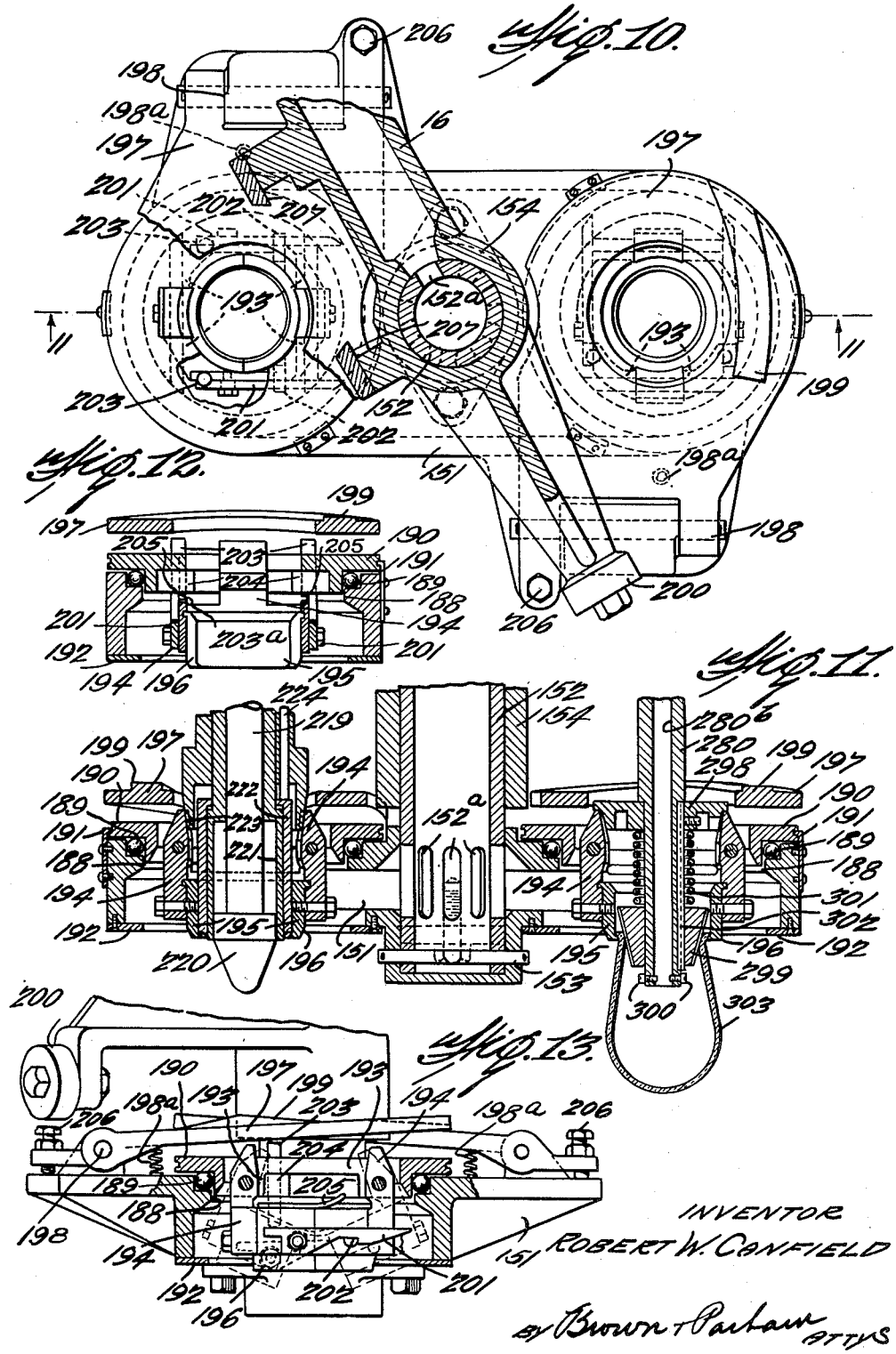

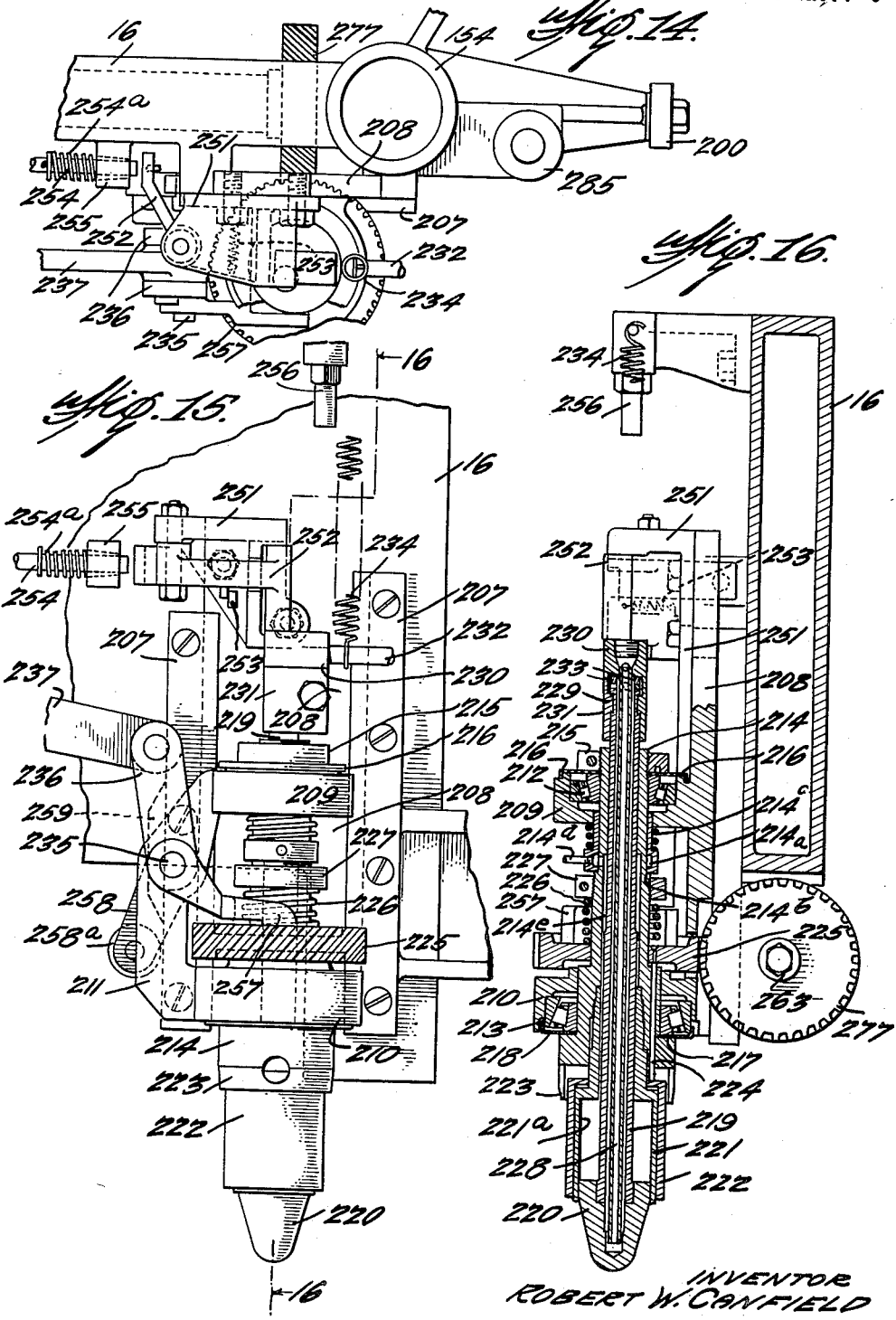

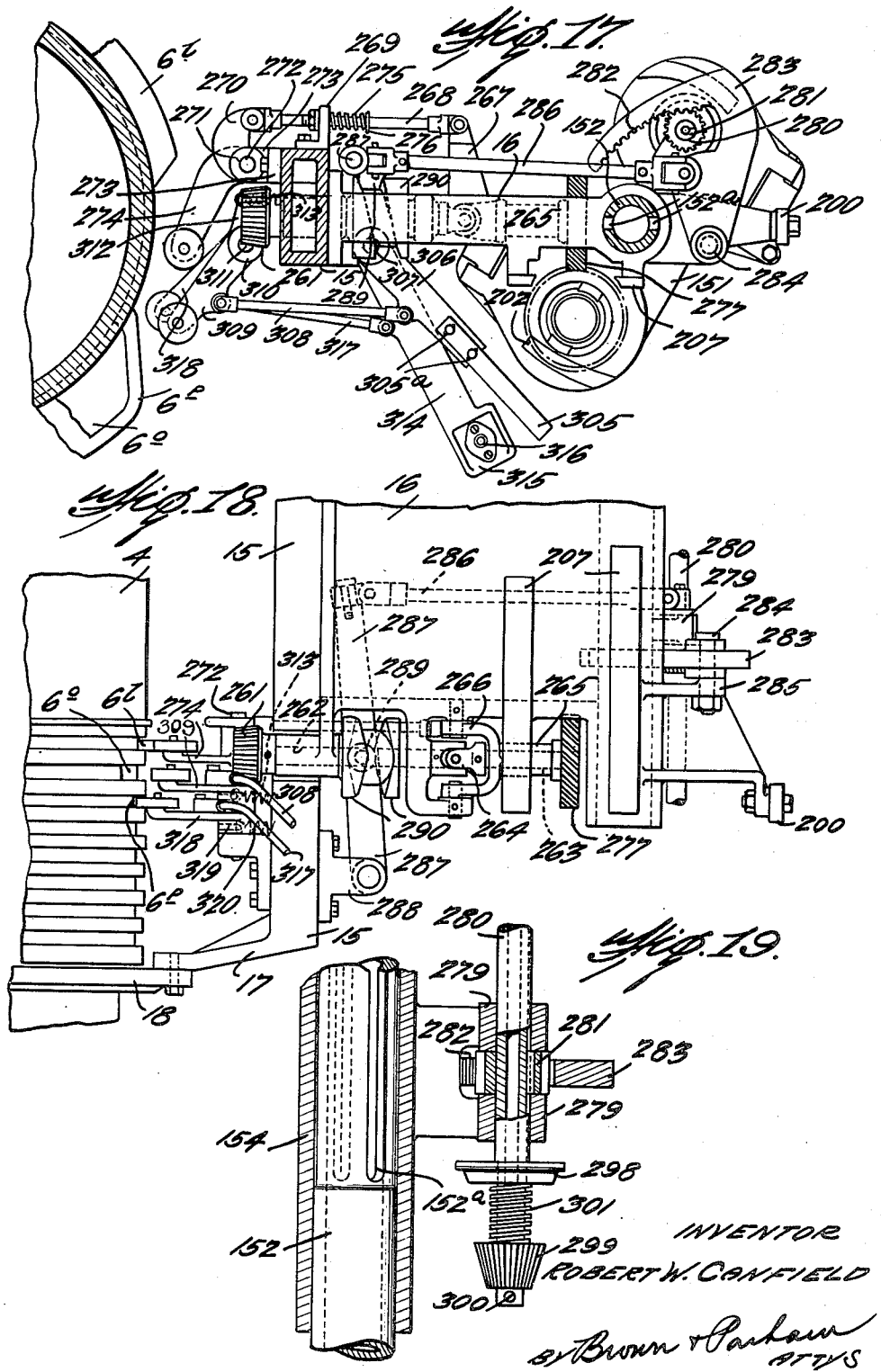

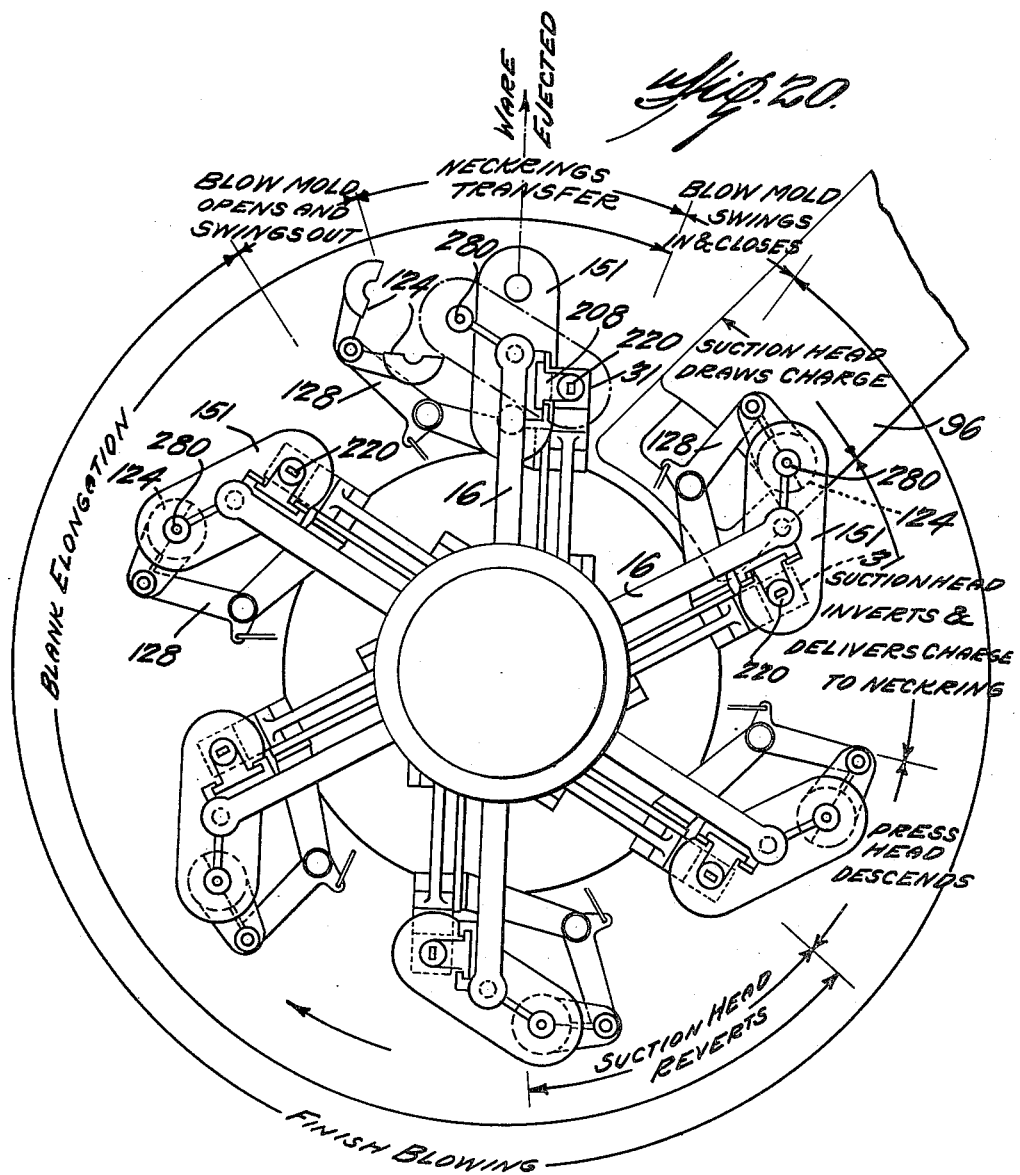

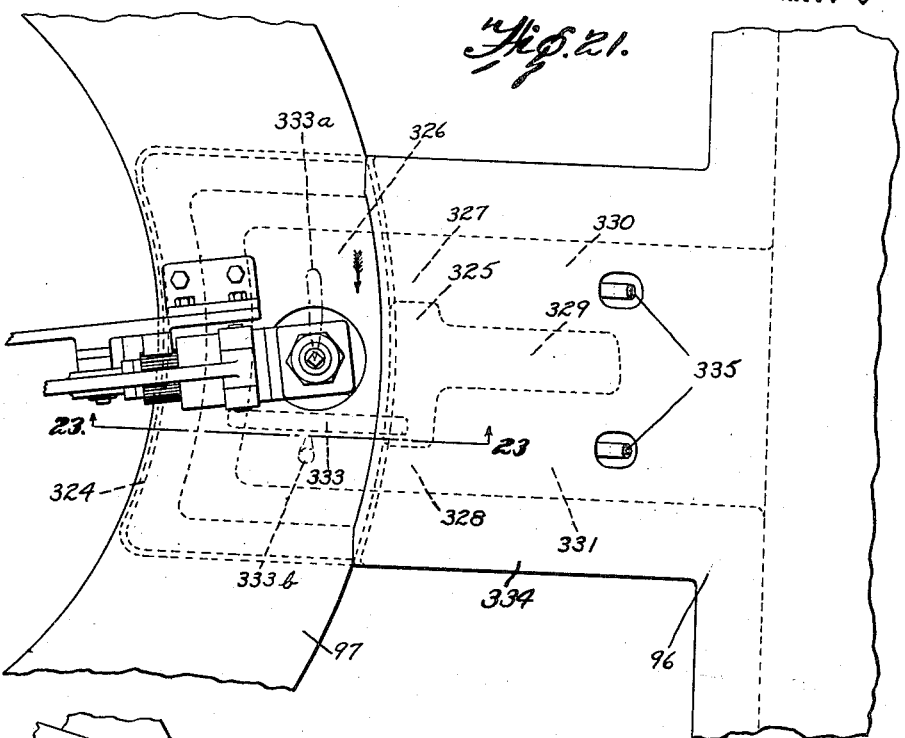
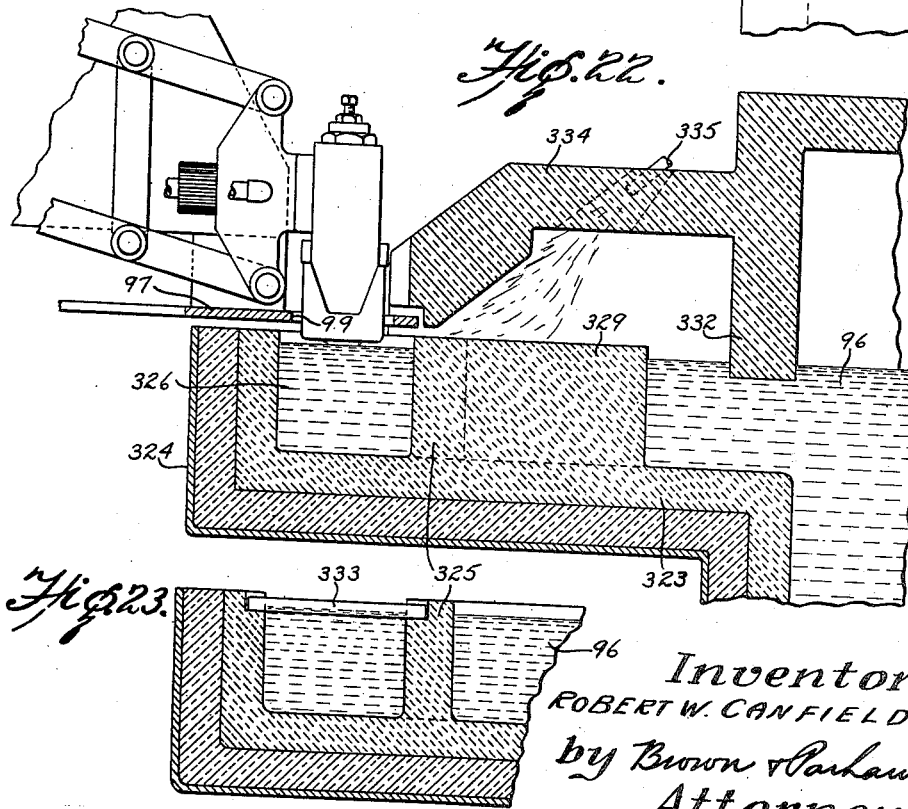

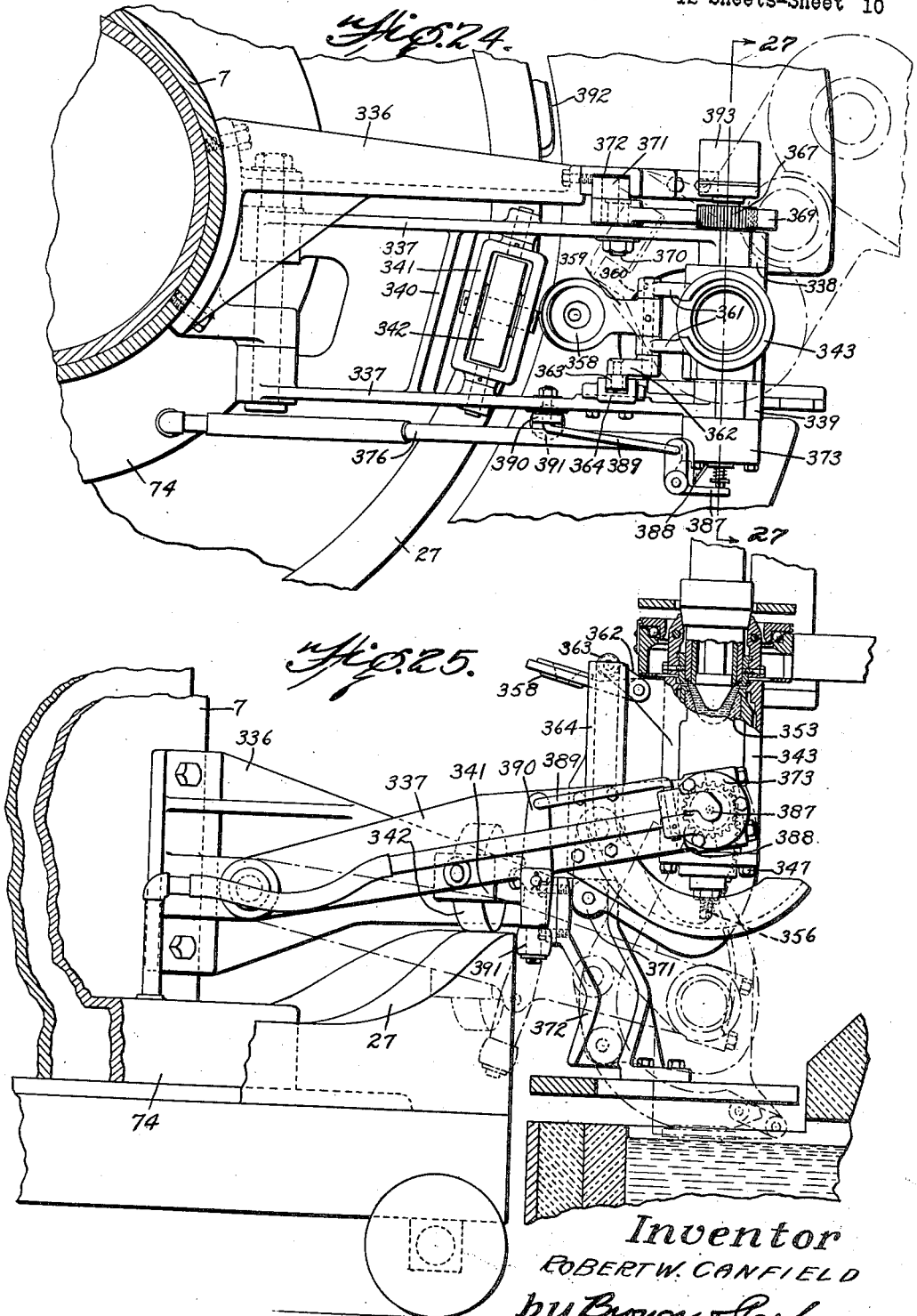

Nov. 1, 1932.  R. W. CANFIELD  1,885,682
APPARATUS FOR FORMING GLASSWARE
Filed July 13, 1929  12 Sheets-Sheet 11
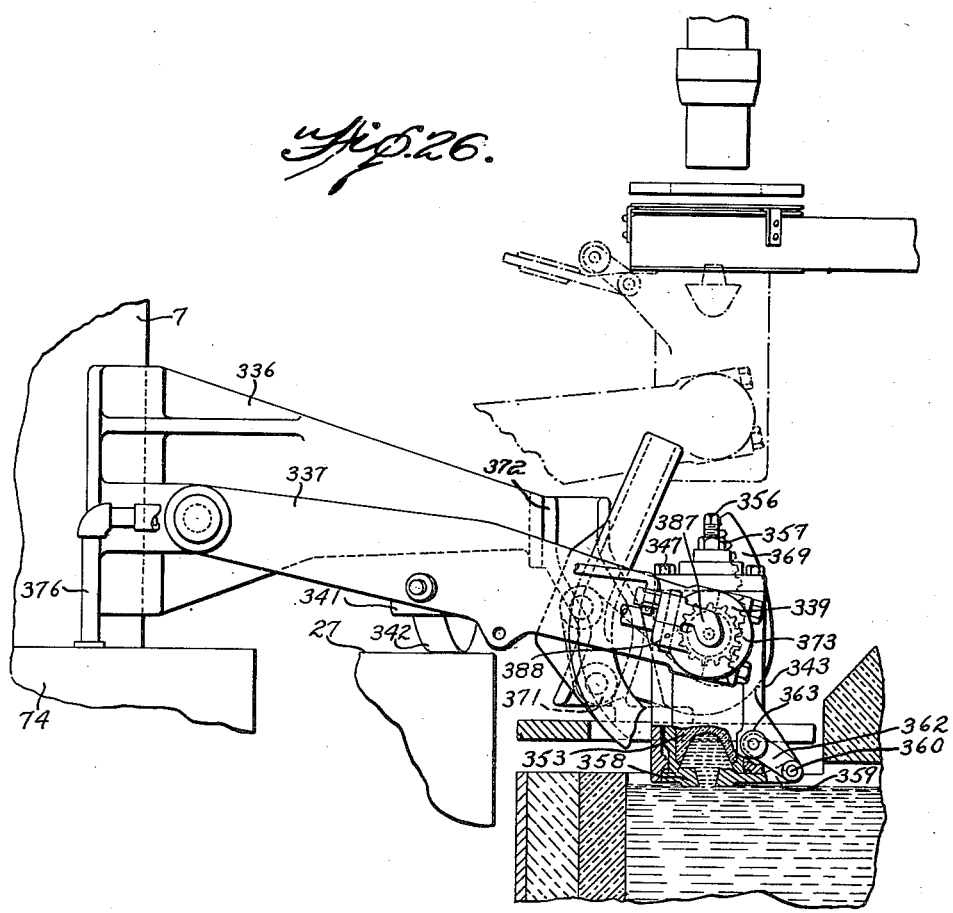
INVENTOR
ROBERT W. CANFIELD
BY Brown & Parham
ATTY'S

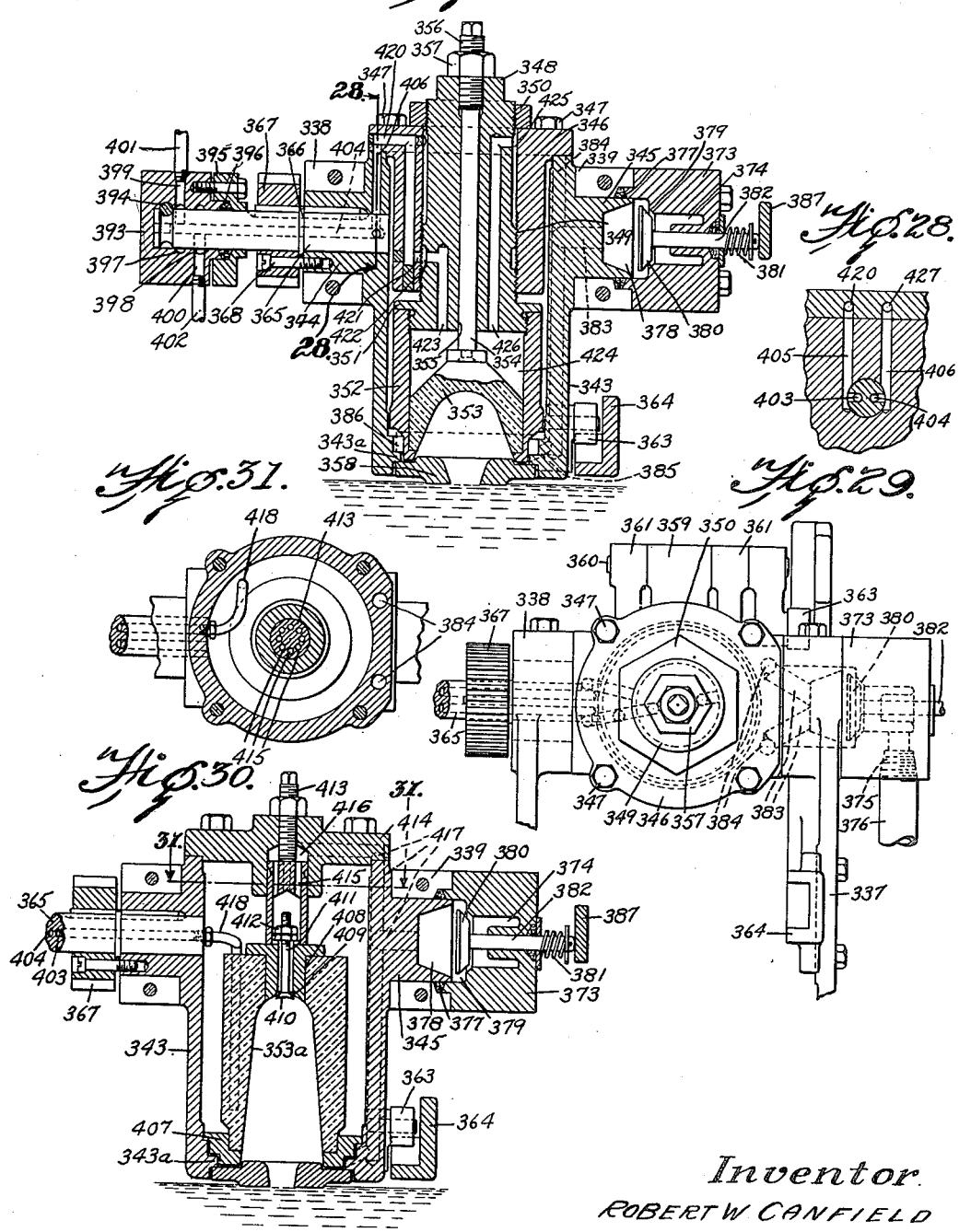

Patented Nov. 1, 1932

1,885,682

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FORMING GLASSWARE

Application filed July 13, 1929. Serial No. 377,934.

My invention relates to apparatus for forming hollow glassware, and it involves the feeding of mold charges of molten glass by the suction process.

It is particularly adapted to the production of glassware in accordance with the press and blow method, but many of its novel features are applicable with great advantage to the general art of forming articles of glass.

Among the principal objects of my invention is the provision of a machine and a method of operation whereby the product may be greatly increased in amount and its quality greatly improved.

Among the improvements in apparatus and method which are presented in the subject matter of my invention are the following:

The employment of a parison mold which is inverted and charged with molten glass by the suction method and which is then reverted and the parison formed therein.

The employment of a suction fed mold which is provided with a removable closure for reducing the suction opening of the mold, which closure is then removed and the parison formed in the mold.

Also the use with the parison mold and the closure of a neck-ring which is brought into operative relation with the mold after the closure is removed and the mold reverted.

The employment of a partial closure in connection with the inverted parison mold during the suction-feed operation which functions as a supplemental container to receive molten glass in excess of the quantity required to charge the mold, which excess portion of glass is employed, after the mold is reverted, in forming the "finish" or neck of the article in the neck-ring, and, in the case of certain characters of product, forms the portion which is cracked off from the finished article. Thus the body of the article is formed with the same skin which is initially produced by the contact of the molten glass with the wall of the parison mold as the glass is sucked into the latter, which skin is not disturbed or shifted in the formation of the parison, thus avoiding laps and waves in the finished product.

The provision of a suction-fed parison mold which is inverted to receive the charge and which is reverted for the parison forming operation, and which is positively positioned when it has been inverted and reverted.

The provision of a machine comprising a rotary mold support whereon suction-fed parison molds and finishing molds are associated in pairs and whereon the charging of the parison molds occurs inside of the path of movement of the finishing molds. Thus the size of the gathering pool may be reduced from those of the present practice, and also, because of the less linear speed of the parison mold sufficient time is provided for properly filling the parison molds with their charges of molten glass.

The provision of a rotary machine provided with a plurality of units comprising a parison mold arranged to be inverted to gather a mold charge by suction, a finishing mold, and a neck ring arranged to be brought into operative relation with the parison mold when the latter is reverted for the parison forming operation and then with the parison suspended therefrom to be moved into operative relation with the blow mold.

The provision of an improved gathering pool from which the charges of molten glass are sucked up into the mold charge containers wherein the dragging of the container in the molten glass during the suction-gathering operation causes a circulation of molten glass in the pool so that a fresh supply of glass at the proper temperature is fed to each mold.

The provision of means for preventing the chilled sheared tails of glass from dropping back into the gathering pool in the path of the gathering containers. Specifically the gathering containers pass over a bridge before the tails are cut, so that the severed ends of the tails drop into the pool on the opposite side of the bridge from the portion of the pool from which the mold charges are gathered and are thus carried by the current in the pool back into the furnace, the heat melting the threads of glass which are dropped on the bridge and which connects said tails to the body of glass in the pool.

The provision of an apron for covering the pool and conserving the heat, which apron travels with the suction-fed receptacle.

The provision of such an apron which travels with the mold support of the machine and which is provided with properly positioned apertures through which the suction-receptacles are projected downwardly into suction-feed relation to the gathering pool.

The provision of such an apron which travels with a rotary mold support upon which are carried invertible parison molds which are periodically inverted for the suction feed operations, such apron being provided with suitably located apertures through which the inverted molds are lowered into suction relation with the glass in the gathering pools.

Other novel features of construction and arrangement of parts and of method of operation, appear in the following description.

In the accompanying drawings, wherein I have illustrated a practical embodiment of the principles of my invention in connection with a paste-mold machine of the press and blow type, Fig. 1 is a diametric section of the machine on a vertical plane, the preferred form of certain of my suction parison molds and associated parts being shown in connection therewith.

Fig. 2 is a plan view of the machine, certain of the parts being omitted and others shown in section for the sake of clearness.

Fig. 3 is a vertical section of a parison mold assembly, the mold being shown inverted and the tank being shown broken away and shown in section.

Fig. 4 is an elevation of a parison mold assembly looking toward the axis of the machine.

Fig. 5 is an enlarged detail in plan of one of the shear mechanisms.

Fig. 6 is an enlarged detail in plan showing the neck-ring platform and the means for intermittently rotating the same.

Fig. 7 is an elevation of the same.

Fig. 8 is a detail in plan, with parts broken away, showing the assemblage at the upper end of the stem by which the neck-ring platform is supported.

Fig. 9 is a vertical section of the same.

Fig. 10 is a broken horizontal section through one of the upper frames and also showing the neck-rings, their platform and their covers.

Fig. 11 is a sectional view taken along the line 11—11 in Fig. 10.

Fig. 12 is a vertical section through the platform, the neck-ring and its cover, the same being taken on a vertical plane.

Fig. 13 is an end view of the neck-ring platform, the carrier and the neck-ring, the latter being broken away for the sake of clearness.

Fig. 14 is an enlarged and broken plan view showing one of the press head assemblages.

Fig. 15 is an elevation of the same.

Fig. 16 is a sectional view taken along the line 16—16 in Fig. 15.

Fig. 17 is an enlarged detail view in plan showing the neck-ring carrier, the means for oscillating the blow head, the necking tool and the parison-reheating of a unit.

Fig. 18 is a broken elevation of the same.

Fig. 19 is a detail in vertical section showing the mounting of the blow-head stem.

Fig. 20 is a diagrammatic plan view illustrating the operation of the machine.

Fig. 21 is a plan view illustrating the gathering of a mold charge by an inverted parison mold from the gathering pool.

Fig. 22 is a view showing the gathering pool and part of the glass-melting furnace in vertical section and illustrating the same operation.

Fig. 23 is a vertical section of the gathering pool taken along the line 23—23 in Fig. 21.

Fig. 24 is a plan view showing a modified form of gathering-parison mold and its associated parts, the same being shown reverted.

Fig. 25 is a side view of the same, the parison mold being shown reverted in full lines and inverted in dotted lines, and the gathering pool being shown in vertical section.

Fig. 26 is a view similar to Fig. 25, but with certain of the parts removed for the sake of clearness.

Fig. 27 is a sectional view taken along the line 27—27 in Fig. 24.

Fig. 28 is a detail section taken along the line 28—28 in Fig. 27.

Fig. 29 is a top plan view of the gathering-parison mold shown inverted from its position in Fig. 24.

Fig. 30 is a vertical section showing another form of the gathering-parison mold.

Fig. 31 is a sectional view of the same taken along the line 31—31 in Fig. 30.

Referring first to Figs. 1 to 20 of the drawings, 1 is a portable base of the machine supported on wheels 2.

A vertical cylindrical column 3 is mounted on the base 1 and has in turn mounted thereon the cam-drum 4 which is provided with circumferentially disposed grooves 5 for the detachably mounted cam-plates which are generally indicated by the numeral 6.

A cylindrical turret 7 is rotatably mounted on the column 3 and has at its lower end an annular bearing plate 8 which is in sliding surface contact with the bearing plate 9 of the base, a film of oil being maintained between the two plates.

The skirt of the turret 7 is provided with an annular bevelled gear 10 which is in mesh with a bevelled pinion 11 mounted on the horizontally disposed driving shaft 12 which is journaled in the base. Thus the turret 7 is revolved on the column 3, the movement being assumed to be in a direction which is clockwise in Fig. 2.

The machine is composed of a plurality of complete operative units symmetrically arranged in relation to the axis of the machine, and each unit comprising an invertible parison-mold, a blow-mold, shears, a rotatable neck-ring platform, a pair of neck-rings, parison-pressing means, blowing means, a necking tool, parison-reheating means, and mechanism for operating the same.

The units are supported from the turret by means of lower and upper frames. The lower frames each comprise a vertical back plate 13, which is detachably secured, as by bolts, to the perimetral surface of the turret 7, and a vertically disposed web 14 which extends outwardly radially of the axis of the turret. The members 13 and 14 may be separate castings and be bolted together.

The upper frames are each comprised of a vertically disposed back plate 15 and a vertically disposed web 16 (Figs. 1 and 17) which extends outwardly and radially of the axis of the machine from the plate 15.

At its lower end each plate 15 is provided with an inwardly and downwardly extending foot 17 which is bolted to the top flange 18 of the turret 7.

At their upper ends the plates 15 are detachably secured to the perimetral surface of a ring member 19 which rotates on the cam drum 4.

The elements 15, 16 and 19 may be hollow and have their interiors connected with each other and with the interior of the drum 4 as by the ports 20, so that air introduced to the interior of the drum through the neck 21 of the drum-lid 22 may be blown into the interiors of the castings for the purpose of cooling.

*Parison molds and assembly*

*(Figs. 1, 2, 3 and 4)*

The parison mold and the blow or finish mold of each set are mounted on the corresponding lower frame 13—14.

23 represents vertically disposed twin supporting plates which are pivotally mounted on the outer ends of the upper and lower parallel links 24, the inner ends of which are pivotally attached on horizontal axes to the frame 13—14.

The links 24 are also pivotally connected to the vertically disposed leg 25, the lower end of which is provided with a roller 26 which travels on the annular cam track 27 mounted on the base 1 and concentric with the axis of the machine.

The track 27 is provided with suitable vertical undulations to raise and lower the plates 23 to provide the desired cycle of movement hereinafter to be described.

The leg 25 is held in proper alinement by the guide bracket 28 fixed on the web 14.

The plates 23 (Fig. 3) support between them the horizontally disposed cylindrical sleeve bearing 29 in which is rotatably mounted the journal 30 of the parison mold carrier 31. The plates 23 and the bearing 29 may be cast integrally.

Pinned or keyed in the inner end of the journal 30 is a shaft 32 which protrudes from and is concentric with the journal 30 and the bearing 29. The shaft 32 has pinned or keyed thereto at its outer end a rectangular keeper 33. Between the end of the journal 30 and the keeper 33 is a broad pinion 34, which is resiliently pressed against the end of the journal 30 by a compression spring 35 set in a recess in one end of the pinion 34. The pinion 34 is suitably splined to the shaft 32, so that parts 30, 32, 33 and 34 all rotate together. The pinion 34 is, however, of sufficient diameter, so that the uncut portion thereof overlies the joint between the journal 30 and the bearing 29, and as it is pressed against this joint by the spring 35, it will stop all leakage of air into this joint, thus insuring a good vacuum for gathering the charge.

The outer end of the journal 30 is provided with an enlarged circular head 36 to which the carrier 31 is detachably secured, as by the bolts 37, (Fig. 4).

The axis of the carrier 31 is disposed at right angles to that of the journal 30 and has at one end—the mold carrying end—a bore 38 of greater diameter than the remaining bore 39.

A cylindrical stem 40 extends through the bore 39 of the carrier and is externally threaded to be screwed into a threaded portion 41 of said bore. A nut 42 is screwed onto said stem against the end of the carrier. The inner end of the stem 40 is provided with a circular head 43 located in the larger bore 38 and bearing against the annular shoulder formed between the two bores. Thus the stem is detachably secured in the carrier.

The perimetral surface of the head 43 is threaded to receive the cylindrical mold-holder 44 which slidably fits the bore 38 and in which the blank mold 45 is mounted. The mold is held against excessive outward movement relative to the holder 44 by an annular lip 46 at the outer end of the latter.

The inner end of the mold 45 has attached thereto the rod 47 which extends up into the axial bore 48 of the stem 40, and 49 is an adjustment bolt screwed into the threaded upper end of said bore to impinge against the end of the rod 47 and hold the mold 45 firmly against the lip 46, a lock nut 50 being screwed up on said bolt against the end of the stem.

Thus the parison-mold is fixed in the carrier in such manner as to be readily removable as for a change of molds.

The parison-mold may be made of brush carbon or other suitable material.

The stem 40 is provided with a pair of longitudinal passages 51 and 52, the outer ends of which are plugged while their inner ends are in communication with the interior of the holder 44 in the rear of the mold 45.

The passages 51 and 52 are connected respectively by ports in the stem 40 with the annular grooves 53 and 54 in the bore of the carrier 31.

The groove 54 is connected by passages 55 in the wall of the carrier 31 and the head 36 with a concentric annular groove 56 in the end of the bearing 29, while similar passages 57 connect the groove 53 with an annular groove 58 similar to the groove 56 in the end of said bearing 29.

The groove 56 is connected through a passage 59 in the bearing 29 to a port 60 while the groove 58 is similarly connected through a passage 61 with a second port 62. Flexible pipes, not shown are connected to said ports.

Thus a current of cooling fluid, such as water, air or steam, may be passing through the stem of the mold holder and in contact with the rear of the mold 45.

The bore 39 is provided with longitudinal grooves 63 in its walls and similarly the head 43 and the exterior wall of the mold-holder 44 are provided with longitudinal grooves 64 communicating with the grooves 63. The outer end of the bore 38 is beveled to form an annular space 65 with which the grooves 64 communicate. The inner end of the grooves 63 connect with an annular chamber 63a formed by cutting out the wall of the bore 39 and reducing the exterior diameter of the stem 40, and at one side of said chamber there is provided a valve seat 66 formed in the end of the journal 30. 67 is a valve arranged to cooperate with said seat and mounted on a stem 68, which extends through the bores of the journal 30 and the shaft 32. The protuding outer end of the valve stem 68 is provided with a washer 69 held in place by a pin. A helical spring 70 bears against the washer 69 and against the inner end of a countersunk outer portion of the bore of the shaft 32, thus tending to hold the valve 67 in its seat and to return it to its closed position. The bore of the journal 30 is provided with radially disposed ports 71 which communicate with an annular groove or enlargement 72 in the wall of the bore of the bearing 29. The groove 72 is also connected through a port 72a with a vacuum pipe 73 (Fig. 1) which is connected in turn to a vacuum manifold 74 surrounding the turret 7 and having its inner wall, which may also be the turret wall, provided with an annular series of ports 75 connecting with an annular groove in the inner wall of the turret, which groove forms with the wall of the column 3 an annular chamber 76. 77 represents a pipe extending up into the column 3 and connected to the chamber 76 through a port in the wall of the column. The pipe 77 is connected to a vacuum pump or other means for maintaining sub-atmospheric pressure. Thus when the valve 67 is open, partial vacuum or suction is applied about the mouth of the parison mold 45 so that if the lower end of said blank mold be brought into proper proximity with the molten glass, as illustrated in Figs. 1 and 3, a portion of the glass will be sucked up to fill the mold 45.

The valve 67 is opened at the proper times by means of a lever 78 pivoted at 79 on the bearing 29 and having its free end provided with a cam block 80, which when the lever is swung into its horizontal position shown at the right in Fig. 1 and also shown in Fig. 3, comes into wedging contact with the outer end of the stem 68 and forces the valve 67 open.

As the parison mold 45 approaches its lowered position, indicated at the right in Fig. 1 and also indicated in Fig. 3, the free end of the lever 78 comes into contact with a post 81, which is fixed to the frame 13—14, thus opening the valve 67. As the blank mold 45 approaches its raised position as indicated at the left in Fig. 1, the lever 78 comes into contact with a pin 82 carried by a block 83 mounted on the frame web 14, causing the lever to be thrown into its inclined position shown in dotted lines at the left in Fig. 1, thus disengaging the cam block 80 from the end of the valve stem 68 and permitting the valve to be closed by the spring 70 and thus cut off the suction.

The wall of the carrier 31 opposite the valve seat 66 is provided with a relief port 84 in which moves the cylindrical plug 85 connected to the valve 67 by means of the frame 86 which surrounds the stem 40 in the chamber 63a. The plug 85 is provided with longitudinal grooves which when the valve 67 is closed have their inner ends in communication with the chamber 65, thus permitting atmospheric pressure to be established within the carrier when the valve 67 is closed. When the valve 67 is opened, the plug 85 is forced outwardly so that the inner ends of its grooves are sealed, thus preventing the entrance of air into the chamber.

87 represents a rack block which is mounted on the side of the web 14 in the path of the pinion 34 as the mold 45 is raised and lowered, so that after the descent of the mold from its position shown at the left in Fig. 1 has begun and the neck ring has been cleared, the pinion 34 engages the rack 87, rotating the journal 30 and with it the mold carrier, thus inverting the mold before it completes its descent. Again, after the upward movement of the parison mold from its lower position shown at the right in Fig. 1 towards its raised position shown at the left in Fig. 1 has begun, the pinion 34 again engages the rack 87, reverting the mold into its upright position before it engages the neck ring.

I provide a means for retaining the parison mold against inversion at the gathering position shown at the right in Fig. 1 and also in Fig. 3, and also at the upper position when it is in engagement with the neck ring seen at the left in Fig. 1. This means comprises a block 87b (Fig. 4) having a vertical surface 87a which contacts with one side of the rectangular keeper 33 at the lower position of the suction head as seen in Figs. 1 and 4, and a block 83 adjacent to the upper position of the suction head, which is adapted to contact with the rectangular keeper 33 at its upper position and retaining it and the suction head against inversion when the latter is in contact with the neck ring. Both blocks are rigidly secured to the web 14. Intermediate the blocks 87b and 83, the head is free to be rotated by engagement of its pinion 34 with the rack segment 87.

The parison molds are each provided with a lid which is arranged to partially close the mouth of the inverted mold when the latter is brought into suction-feed relation with the supply of molten glass as illustrated in Figs. 3 and 4 and at the right in Fig. 1.

In these figures the lid is of a partible type comprising two halves or portions 88 which are carried by levers 89 pivoted on the shafts 90 which extend through holes in the carrier 31. The levers 89 are provided with arms 91, the outer ends of which are provided with holes through which pass a common pivot bolt 92 carrying a roller 93. The bolt hole in one of the arms is slotted as shown in Fig. 4 to provide for the necessary lost motion. The roller 93 engages a cam track 94 which may be cast integral with the sleeve 29, and said cam track is given such contour that when the carrier is turned to invert the mold 45, the lids 88 are brought into their closed position.

The lids when closed provide a reduced feed opening 95 for the mouth of the mold and assist in the suction filling of the mold with the molten glass.

In Fig. 4 the dotted line which indicates the parts 89 is to be understood merely as illustrative of the open position of said parts and not of their relationship to other parts when open.

As shown at the right in Fig. 1 and also as shown in Fig. 3, 96 represents a portion of a glass furnace in which is maintained a body of molten glass. 97 is an annular apron or cover plate which moves with the turret and is supported therefrom as by the brackets 98 bolted to the webs 14 (Fig. 4). At each mold position the apron is provided with an opening 99 through which the inverted parison mold 45 is lowered at the proper time into suction-feed relation with the glass in the furnace 96. The parison molds are inverted and their lids 88 closed before they descend into the apertures 99, and the molds are raised from said apertures before they are reverted and their lids opened.

The apron 97 may be formed of any suitable heat-resistant material. Thus I may employ a refractory material, such as that disclosed in Letters Patent No. 1,605,885, issued November 2, 1926.

For opening the lid at the upper position of the parison mold, I provide a bracket member 100, which is adapted to contact with the hook 101 (Fig. 4) rigid with one of the lid members 88, motion being imparted to the other lid member through the levers 91 above described. Thus, the lids 88 will be opened by the upward movement of the parison mold 45 to a position in engagement with the neck ring and will be fully opened at such engaging position, and the lids will be closed by the action of the cam 94 cooperating with the roller 93 as the suction head is reverted in its downward movement to its position for gathering as shown in Fig. 3.

*The shears*

Each unit is provided with shear means for cutting the neck of glass which connects the mold charge sucked up into the inverted parison mold and the glass in the tank 96.

These shears are preferably of the pivotally connected blade type indicated at 102 in Figs. 2 and 5. Thus 103 represents a horizontally disposed lever keyed on the lower end of a shaft 104 journaled in the bearing 105 carried by the web 14.

The free end of the lever 103 has mounted thereon the flat plate 106 having its rear edge provided with an abutment flange 107.

Pivotally mounted on the lever 103 is a secondary lever 108 the free end of which carries the shear supporting plate 109 which slides over the plate 106 and has interposed between its downwardly flanged rear edge and the flange 107 the springs 110 which tend to throw the plate 109 forwardly relative to the plate 106.

The shear blades 102 are pivoted to and beneath the plate 109 on a pin 111 which pin protrudes above the plate 109.

The sides of the blades 102 are provided with the notches 112 which are engaged by pins 113 extending upwardly from the plate 106, the notches being inclined so that when the plate 109 is forced toward the abutment 107, the shear blades will close together but as such force is relieved the spring 110 will cause the blades to open.

A stop 114 is mounted on the lower portion of the web 14, which stop, when the lever 103 is swung clockwise in Figs. 2 and 5, as will hereafter appear, is engaged by the pivot pin 111, causing the blades to close beneath the orifice of the parison mold, shearing the neck of glass.

115, 116 and 117 represent three vertically disposed shafts arranged in nested relation and journaled in the bearing 118 carried by the frame web 14.

The lower end of the central shaft 115 is extended downwardly and provided with a radially disposed lever 119 (Figs. 1, 2 and 4) which is connected by a link 120 with the lever 103. A spring 121 connects the lever 119 with a point fixed relative to the frame web 14, which spring tends to swing the levers 119 and 103 clockwise in Figs. 2 and 5, thus causing the shears to close beneath the inverted blank mold.

The upper end of the shaft 115 is provided with a radially disposed lever 122 having at its outer end a roller which is held in contact with the edge of the cam plate 6a carried by the cam drum 4. The tension of the spring 121 holds the roller in engagement with the cam plate 6a.

The cam plate 6a is provided with a depression or valley 123 which is so located, as indicated in Fig. 2, that after an inverted blank mold has been charged by suction and before it passes from above the tank 96, the roller of the corresponding lever 122 engages the valley 123, thus permitting the spring 121 to swing the lever 103 clockwise to position and close the shears beneath the blank mold. As the roller passes beyond the valley, the lever 103 is retracted counterclockwise in Fig. 2 and the shears open, the shears remaining open and retracted until the next charge is sucked into the inverted parison mold.

*Blow molds and assemblage*

*(Figs. 1 and 2)*

Each unit of the machine includes a blow or finishing mold comprising the mold parts or halves 124. The parts are provided with hinge arms 125 engaged by the vertical pintle 126 rising from the platform 127 which is carried by an arm 128 pivotally mounted on a vertical axis on the outer end of a bracket 129 extending from the frame-web 14.

A crank 130 extends from the side of the arm 128 and has pivotally connected thereto as by means of a vertical pintle pin 131 the sleeve member 132 through which extends the link 133, the outer end of which is provided with adjustable limiting nuts. The inner end of the link 133 is connected to a crank arm 134 of a collar 135 pinned on the lower end of the intermediate shaft 116. A spring 136 is coiled about the link 133 between a collar fixed on said link and the end of the sleeve member 132. The upper end of the shaft 116 has pinned thereon the collar 137 having opposed levers 138 provided with rollers which engage the cam plates 6b and 6c, respectively. Said cam plates are so arranged that at the proper time the arm 128 is swung in one direction, clockwise in Fig. 2, to position the blow mold under the blowing head, and then, after the blowing operation has been completed, to swing the arm 128 counterclockwise to retract the blow mold from under the blow head.

The mechanisms for opening and closing the blow molds are substantially similar to those shown in my copending application, Ser. No. 320,109, filed Nov. 17, 1928 and are as follows:

The blow mold parts are opened and closed by means of the actuating member 139 which is shifted by means of a crank 140 provided with a pivotally connected sleeve 141 through which extends the link 142 having its outer end provided with adjustable limiting nuts 143. A spring 144 is coiled about the link between a shoulder near its inner end and the inner end of the sleeve 141. The inner end of the link 142 is pivotally connected to one arm of a bell-crank lever 145 pivotally mounted on the pintle 131, while the other arm of said bell-crank lever is connected by a link 146 with a crank arm 147 of a collar 148 pinned on the lower end of the outer shaft 117.

The upper end of the shaft 117 has pinned thereon a collar 149 provided with the two levers 150 provided at their outer ends with rollers which engage the opposed cam plates 6d and 6e.

The arrangement of the parts and the shape of the cam plates are such that as the mold is moved into position beneath the blow head, the mold parts are closed together, and before the mold has been retracted from beneath the blow head it is opened.

*Neck rings and assemblage*

*(Figs. 1, 2, 6, 7, 8, 9, 10, 11, 12 and 13)*

Two neck rings are provided for each unit, the same being mounted on a neck ring platform 151 which is a hollow casting, generally oblong in shape and which is provided with a central circular opening in which the lower end of a vertically disposed tubular shaft 152 (Fig. 11) is pinned as at 153.

The shaft 152 is journaled in a sleeve bearing 154 which may be integral with the frame web 16. The wall of the shaft 152 is provided with elongated ports 152a in its upper and lower ends, so that the cooling air or other fluid may flow from the interior of the frame web 16 through the shaft and into the interior of the platform 151, thus preventing overheating of the neck rings.

At the upper end of the bearing 154 the shaft 152 is diametrically enlarged and has secured thereon the disk 155 (Figs. 6, 7 and 9) which rests on the upper end of said bearing. Above the disk 155 and fixed relatively thereto is a disk 156 of larger diameter, the perimetral surface of which is employed as a brake drum which is encircled by the brake band 157, the free end of which is provided with a pierced ear 158 and through a fixed ear 158a extends the link 159 having an adjustable abutment nut on its outer end and a spring 160 coiled about the link between the ears. The left-hand ear 158a, as seen in Fig. 11, is formed rigid with a suitable bracket secured to the frame web 16.

The inner end of the link 159 is pivotally connected to a crank arm 161 of a sleeve 162 rotatably mounted on a vertically disposed pivot shaft 163, the ends of which are secured in brackets 164 on the rear face of the frame member 15.

The sleeve 162 is provided with a second crank arm 165 carrying a roller which engages a cam-plate 6f on the drum 4, which cam plate has its perimetral surface so contoured as to tighten and loosen the brake band 157 on the disk 156 at the proper intervals. This prevents spinning of shaft 152.

A ratchet disk 166 (Figs. 8 and 9) is loosely mounted on the shaft 152 above the disk 156, said ratchet disk being provided with a pair of diametrically opposed shoulders 167 which face clockwise, said shoulders being arranged for engagement by a pawl 168 pivotally mounted on the disk 156 and held against the perimeter of the disk 166 by a spring 169.

A pinion 170 is loosely mounted on the shaft 152 above the disk 166, said pinion being fixed to said disk, as by a bolt 171. A cap 172 is clamped on the upper end of the shaft 152 to hold the parts in assemblage.

173 represents a segmental gear in mesh with the pinion 170 and mounted on the outer end of a lever 174 which is pivoted on the shaft 163 and is provided with a pair of arms 175 provided at their outer ends with rollers which engage the complementary cam plates 6g, the perimetral contours of which are such as to oscillate the lever 174 and its segmental gear 173 at the proper times.

It is evident that when the segmental gear 173 rotates the pinion 170 clockwise in Figs. 2 and 6, the shaft 152 is rotated 180 degrees, but when it rotates the pinion counterclockwise the pawl 168 trails over the perimeter of the ratchet disk 166 and the shaft 152 is idle.

The perimeter of the disk 155 is provided at properly positioned and diametrically opposed points with a pair of notches 176 which are arranged to be engaged by the locking bolt 177 slidable in a casing 178 on the frame member 16. The bolt 177 is resiliently urged into engagement with the disk 155 by a spring 179. The bolt is retracted at proper intervals by means of a link 180 which connects the rear end of the bolt to a crank 181 on a rock shaft 182 journaled in a bearing 183 on the frame web 16. The other end of the shaft 182 is provided with a crank 184 which in turn is connected by a link 185 with a crank arm 186 on the sleeve 187 rotatably mounted on the shaft 163. The sleeve 187 is also provided with a second arm bearing a roller which engages a cam plate 6h at the proper intervals to retract the bolt and thus unlock the neck ring platform so that it may be rotated a half-turn.

The neck-ring platform 151 is provided with a pair of circular openings 188 (Figs. 11 and 13) symmetrically arranged on opposite sides of the axis of movement, which openings are provided at their upper ends with raceways for the anti-friction balls 189 upon which the annular neck-ring carriers 190 are mounted to rotate. The carriers are held in their seats by means of clips 191 secured to the platform and engaging perimetrally arranged grooves on the carriers.

The openings in the bottom wall of the platform are of greater diameter than in the top wall, and may be provided with the detachably mounted edge rings 192, the bores of which are of proper diameter to permit the upward insertion of the top of the reverted blank mold.

The carrier rings 190 are each provided with two pairs of opposed pierced ears 193 which pivotally support the neck ring levers 194 on the lower ends of which are detachably mounted, as by bolts, the halves or parts 195 of the partible neck rings.

The lower perimetral edges of the neck rings are beveled as shown at 196 so that the engagement therewith of the complementary beveled upper end of the parison mold support forming the outer wall of the chamber 65 (Fig. 3) will force and hold the neck rings tightly closed.

It will be understood that the proper type of neck rings to suit the character of ware to be fabricated on the machine will be installed on the machine.

An annular cover 197 is movably mounted above each neck ring, said covers being hinged as at 198 to the platform 151 and being normally held elevated, as shown in Figs. 11, 12 and 13, by means of the compression springs 198a which are set in suitable bores in the platform 151 and bear against the covers 197.

The covers 197 are provided on their upper faces with the cam tracks 199 which are in turn engaged from above by the roller 200 mounted on the outer end of the frame web 16 as the platform 151 is intermittently rotated.

When the neck ring parts 195 close together a pair of notched latches 201 pivotally mounted on one of the semi-annular neck ring levers 194 drops into engagement with pins 202 on the other lever, thus locking the neck ring closed against accidental opening.

When the cover 197 is depressed, the pins 203, which are slidably mounted in suitable sleeves 204 rigid with the carrier 190, are forced downwardly against the tails of said latches, thus disengaging their notches from the pins 202 and thus unlocking the neck rings so that the further descent of the cover may force the neck ring wide open to release the finished ware by contact between the shoulders 203a (Fig. 12) of the pins 203 with the levers 194.

The latches 201 are extended forwardly a sufficient distance so that they will always be above or in engagement with the pins 202, even when the neck ring halves are in their full open position. Leaf springs 205 are fastened to one of the neck ring holder levers 194 and extend over the other, so that motion is transmitted from one of the neck ring halves to the other in opening the neck ring, the motions being imparted to one of the halves, as above stated, by the downward movement of the pins 203 caused by the downward movement of the covers 197 in riding under the roller 200 and against the action of the compression springs 198a. Upward movement of the covers 197 under the action of the springs 198a is stopped at a desired point by the set screws 206 threaded through the rearwardly extending lugs on the covers 197 and bearing against suitable projecting portions of the platform 151, these set screws being locked in adjusted position by jam units threaded thereon and bearing against the rearwardly extending portions of the covers 197 (Figs. 10 and 13). Closing movement of the neck ring is effected by the upward movement of the blank mold, which contacts with the bottoms of the neck ring halves and forces them together, moving the pins 203 upwardly and permitting the latches 201 to drop over the pins 202 and lock the neck ring halves in closed position, the latches being engaged with the pins 202 by their own weight.

*The press heads for forming the parisons*
*(Figs. 1, 2, 11, 14, 15, 16, 17 and 18)*

Each of the units of the machine is provided with a parison-forming press head which is illustrated as of the following construction. On the front side, that is in the direction of the unit's movement the frame-web 16 is provided with a pair of vertically disposed guides 207 (Figs. 10, 14 and 15) in which is slidably mounted the back plate 208 of the press head support. Extending forwardly from the plate 208 are the upper and lower annular shelves 209 and 210. At one side, the left side in Fig. 15, the shelves are connected by a pair of parallel struts 211. The back plate, shelves and struts are preferably a unitary, cast structure.

The upper shelf 209 is recessed to form a cup in which is mounted the anti-friction bearing 212 and the lower shelf is of inverted cup form to receive the anti-friction bearing 213. A sleeve 214 extends through said bearings and is thus rotatable therein. The sleeve is prevented from downward movement relative to the shelves by means of the split clamping nut 215 which is screwed onto the threaded exterior of the sleeve above the bearing 212, a shield 216 being held below the nut to prevent the entrance of dirt into the bearing. The shoulder 217 of the sleeve prevents upward movement of the latter relative to the shelf 210. A shield 218 protects the bearing 213 from below.

A hollow stem 219 is vertically slidable in the bore of the sleeve 214, the lower end of the stem having detachably mounted thereon the pressing plunger 220.

The pressing plunger is slidable in a cylindrical barrel 221 provided with a tubular neck, which is threaded and screwed up into an enlarged and internally threaded portion of the bore of the sleeve 214.

A stripper sleeve 222 surrounds the barrel 221 and is slidable thereon, the sleeve having an inturned flange at its upper end which encircles the neck of the barrel. The lower end of the sleeve 214 is provided with a depending annular guide 223 which holds the stripper sleeve in proper alinement.

The wall of the enlarged lower end of the sleeve 214 is provided with one or more vertical bores in which are slidably mounted the rods 224 (Figs. 11 and 16), the lower ends of which impinge on the top flange of the stripper sleeve 222, and the upper ends of which are secured to a spiral pinion 225 (Fig. 16) which is splined or otherwise mounted on the sleeve 214 so as to be slidable on the latter but to rotate in unison therewith.

The pinion is resiliently depressed relative to the sleeve 214 by means of the spring 226 coiled about the sleeve 214 between the pinion and a split clamping nut 227 on a threaded portion of the sleeve.

Within the stem 219 is a pipe 228 of small enough diameter to provide an annular passage between the pipe and the stem, and within the hollow of the plunger 220 the bore of the pipe and said annular passage are in communication.

Near its upper end the stem 219 is provided with a reduced portion or neck 229 and a chambered head-block 230 is mounted on the upper end of said stem and has a lip which engages the neck 229, the head block 230 being held in place by a front plate 231 held in place by a cap screw. The upper end of the pipe 228 communicates with a central chamber in the block 230 and air or other cooling fluid is supplied to said chamber by means of a pipe 232. The upper end of the stem 219 is provided with radially disposed ports 233 so that the fluid after circulating down the stem and within the plunger may escape to atmosphere around the plate 231. A spring 234 connects the pipe 232 with a fixed point on the frame web 16 and tends to elevate the plunger.

A horizontally disposed shaft 235 is journaled in bearings in the struts 211 and has its ends protruding beyond said bearings. Twin links 236 connect the shaft 235 to the outer end of a lever 237, the inner end of which is connected to a crank 238 (Fig. 1) on a shaft 239 journaled in the bracket 164. The other end of the shaft 239 has fixed thereon a lever 240 from the outer end of which a spring 241 extends downwardly to a fixed point on the back plate 15.

Intermediate of its length the lever 237 is connected by the lever 242 to the lower end of a lever 243, the upper end of which is pivotally connected to a bracket 244 mounted on the back plate 15.

The lever 243 has a block 245 pivotally mounted thereon on a horizontal axis intermediate of the lever length and pivoted to said block on a vertical axis is a second block 246 which has adjustably screwed therein one end of a rod 247, the other end of which is pivotally connected on an eccentric vertical axis to a sleeve 248 on the shaft 163. The sleeve 248 is provided with arms 249 and 250 carrying rollers which engage the cam plate 6i and 6j, respectively, said cam plates being arranged to raise and lower the back plate 208 at the proper intervals.

In the event that the plunger should contact with the glass and its motion be interrupted so that breakage might occur, the linkage above described is arranged to yield. The yielding action of this linkage is as follows: the toggle formed by levers 243 and 242 (Fig. 1) will be positively straightened out by the cams 6i and 6j acting through the rollers and the lever mechanism above described, which will force downwardly the point of connection between levers 242 and 237. As the right hand end of the lever 237 as seen at Fig. 1 cannot be moved downwardly due to the press head having met an obstruction, the left hand end of the lever 237 will be moved downwardly, rotating the crank 238 and the lever 240 in a counterclockwise direction about the pivot 239 and extending the tension spring 241. Thus, I have provided an arrangement such that the downward movement of the plunger is resilient and yet is controlled by a positive cam and a toggle so that the necessary force may be imparted to the press head in pressing the parison, the limit of this force being dependent upon the tension of the spring 241.

251 (Fig. 15) represents a bracket mounted on the back plate 208 and having pivotally mounted thereon the stop latch 252 which is resiliently held in the path of the block 230 by a spring 253 (Fig. 16).

It is evident that when the latch 252 is in place, the pressing plunger 220 is held depressed relatively to the sleeve 214.

To retract the latch a rod 254 is slidably mounted in guides on the web plate 16, one of which guides is shown at 255, at the proper elevation to be horizontally aligned with the angular tail of the latch 252 when the pressing head and the plunger are both depressed. The inner end of said rod is pivoted eccentrically to a rocker sleeve on the shaft 163, which sleeve carries a roller which engages a cam plate 6k, (Fig. 1). The cam plate 6k is arranged to force the rod 254 outwardly when the blank-pressing operation is completed, thus retracting the latch and permitting the spring 234 to retract the plunger 220 upwardly within the barrel 221.

The rod 254, Figs. 14 and 15, is urged to the left as seen in these figures by a suitable compression spring 254a coiled about the rod and extending between the guide 255 and a suitable collar secured to the rod, this spring thus serving to hold the roller in engagement with its operating cam 6k.

As the press head is elevated the block 230 strikes the adjustable stop 256, which halts the ascent of the stem 219 and the plunger 220 before the press head reaches its raised position, thus permitting the spring-actuated latch 252 to move about the block 230 and thereby again setting the plunger in its depressed position relative to its barrel 221.

257 represents a bifurcated lever keyed on the shaft 235 and straddling the sleeve 214 and the spring 226 to bear on the pinion 225. The shaft has also keyed on its inner end the crank arm 258 carrying a roller 258a which is in the path of a cam block 259 on one of the guides 207. The cam block is so located and proportioned, that as the press head starts to rise, after a blank-pressing operation, the lever 257 is swung downwardly, thus depressing the pinion 225 relative to the sleeve 214, which in turn momentarily prevents the ascent of the stripper sleeve 222, thus holding the parison in the mold and preventing it following the press head and the plunger.

The cam drum 4 has mounted thereon the stationary ring gear 260, (Fig. 1) and each of the units of the machine is provided with a pinion 261, (Figs. 17 and 18), meshing with the ring gear and mounted on a horizontal shaft 262, which is journaled in bearings depending from the frame-web 16. A second shaft 263 is connected to the outer end of the shaft 262 by a universal joint 264, and said second shaft is journaled in a sleeve bearing 265 carried by a yoke 266 which is hinged to swing on a vertical axis. A lever 267 is fixed to said yoke and connected to a link 268 which extends through an enlarged opening in the bracket 269 carried by the back plate 15. The inner end of the link 268 is connected to a crank 270 of a sleeve 271 rotatably mounted on a vertical shaft 272 supported by a bracket 273 from the back plate 15. The sleeve 271 is provided with an arm 274 carrying a roller arranged to be engaged by the cam plate 6*l*. The spring 275 is coiled about the link 268 between the bracket 269 and a washer 276 fixed on the link and tends to resiliently hold the shaft 263 in alinement with the shaft 262 and to return the first named shaft to such alinement, while the periodic engagement of the roller with the cam plate 6*l* causes the shaft 263 to be swung, counter-clockwise in Fig. 17, out of such alinement.

When the press head is depressed and the pressing plunger 220 elevated for blowing a blank, the shaft 263 is swung into alinement with the shaft 262 and a spiral pinion 277 mounted on the outer end of the shaft 263 is thus brought into mesh with the pinion 225 of the press head, thus causing the sleeve 214 to be rotated.

The insertion of the stripper sleeve 222 into the upper end of the neck ring (Fig. 11) and the wedging of the beveled lower portion of the guide 223 down into engagement with the upper tapered ends of levers 194 which carry the neck ring parts produce a frictional engagement between the rotating press head and the neck ring which results in the rotation of the blank during the puff blowing operation which follows the pressing of the blank or parison, the neck ring being stationary during the pressing operation as the pinion 277 is held out of engagement with the pinion 225 at this time by the cam 6*l*.

Simultaneously with or shortly after the parison mold 45 begins its next descent, the pressing plunger 220 is raised with respect to the barrel 221 and puff blowing air is supplied to the parison to effect its elongation and assist the action of gravity in producing a parison form which may be substantially as shown at the right in Fig. 11. For this purpose I provide on the sleeve member 214 an annular member 214*a* (Fig. 16) which does not rotate but is vertically slidably mounted in the shelf member 209 and is pressed down against the shoulder 214*b* of the member 214 by a suitable compression spring 214*c* extending between an enlarged portion of the member 214*a* and the under side of the shelf 209. Air is admitted to the member 214*a* through a suitable nipple 214*d* and flows thence through the annular space in this member, through a suitable bore seen at the left in Fig. 16, downwardly through the annular space 214*e* between the member 219 and the sleeve 214 and thence along the longitudinal grooves 221*a* formed in the inside of the member 221 and around the plunger to the parison, these grooves terminate above the bottom of the member 221 so that no openings are provided into which glass may be forced during the pressing operation. The puff blowing air is derived from any suitable source, but I prefer to use a structure such as is shown in my copending application, Serial No. 320,109, filed November 17, 1928, this construction however not being shown in the present case, as it forms no part of the present invention.

When the desired elongation of the parison has been effected, the shaft 263 and the pinion 277 are swung aside, the press head is then raised by the action of the cams 6*i* and 6*j*, through the toggle mechanism described above which raises the slide 208 in the guide 207, and the neck ring platform 151 is then indexed 180° by the action of the cams 6*g* through the segmental gear 173 shown in Fig. 6, bringing the neck ring with the parison therein below the blow head presently to be described. During the elongation and puff blowing of the parison, it may be desirable to reheat the parison to some extent and to constrict the upper portion thereof, and for this reason I have provided a heating burner and necking tool for the same purpose as that described in a similar connection in the Canfield application, above referred to, these parts will be described later in detail.

It will be noted that the circular path of movement of the suction-gathering parison molds is a shorter radius than is the path of the finishing molds.

This is a very important improvement and results in a number of important advantages.

Thus the arc of movement of the parison molds during the mold charge gathering operation is shorter than would otherwise be possible, thereby reducing the necessary length of the gathering pool.

Again the linear speed of the travel of the parison molds is reduced, thereby providing ample time for the charges to be sucked up into the parison molds.

Again it provides clearance for the take-out or discharge of the finished ware at the outside of the machine.

*Blow head and assembly*
*(Figs. 1, 2, 6, 11, 17, 18 and 19)*

Each web-plate 16, on its side opposite the guides 207 is provided with vertically alined upper and lower sleeve bearings 278 and 279 (Figs. 7, 17, 18 and 19). The lower bearing is duplex or interrupted as illustrated in Fig. 19.

The blow stem 280 is mounted in said bearings for both rotary and vertical movement.

A pinion 281 occupies the interruption in the lower bearing 279 and is splined on the stem 280, so that the stem will rotate with the pinion and also slide independently thereof.

282 represents a segmental gear formed on the swing-plate 283 which is pivotally mounted on a pin 284 supported in a socket 285 formed on the end of the web plate 16. The plate 283 is connected by a link 286 to the upper end of the lever 287 the lower end of which is pivoted to a bracket 288 mounted on the back plate 15. Intermediate of its length the lever 287 is provided with a contact roller 289 which engages a cam slot in a sleeve 290 mounted on the shaft 262, so that as said shaft revolves the stem 280 is rotated alternately in opposite directions.

The stem 280 (Figs. 1 and 7) is provided with a neck or portion of reduced diameter which is encircled by a split collar 291 rotatable with respect to said stem and provided with diametrically opposed trunnions 292 which are journaled in slots in the forked outer end of a bell crank lever 293 the intermediate portion of which is pivotally mounted on a pin carried by the web-plate 16 and the inner end of which is connected by a link 294 to a crank on a sleeve 295 on the shaft 163. The sleeve 295 is provided with levers 296 and 297 having rollers on their outer ends. The rollers respectively come into periodical engagement with the cam plates 6m and 6n, which are arranged to raise and lower the stem 280 at the proper times.

The lower end of the stem 280 (Figs. 11 and 19) is of reduced diameter forming the circumferential shoulder against which is fixed the annular closure plate 298. Slidably mounted on the lower end of the stem 280 is the conical head member 299. The member 299 is prevented from disengagement from the stem as by the screws 300 and is pressed downwardly by the spring 301. The plate 298 and the member 299 are held from rotation relative to the stem 280 by the key 302.

When the blow head is lowered into the neck ring the member 299 is inserted downwardly into the upper end of the parison 303 which is suspended by the neck ring in the blowing position, the member 299 being vertically ribbed or fluted to give frictional engagement, while the plate 298 which has a tapered perimetral surface wedges downwardly between the neck-ring levers 194. Thus the rotary movements of the blow head in opposite directions are imparted to the blank within the blow mold during the blowing operation.

The stem 280 is closed at its upper end, and a lateral bore 280a is provided communicating between the outside of the stem 280 and the longitudinal bore 280b. At the lower position of the stem 280, the lateral bore 280a is positioned opposite the annular space 278a within the bearing 278 (Fig. 7). Final blowing air is supplied to the annular space 278a through the pipe 304 from any suitable source of air at the desired pressure, this supply being preferably of the type shown in my copending application above referred to and being controlled by similar mechanism. Inasmuch as this feature also forms no part of the present invention, it will not be further described in detail.

*Necking tool and operation thereof*
*(Figs. 1, 2 and 17)*

In many cases it is necessary to "neck" or constrict the upper end of the parison before it is delivered to the blow mold. For this purpose a necking tool is provided.

The tool 305, which may be of blade form, is adjustably mounted on the lever 306 which is pivotally mounted on a pin 307 supported from the frame web 16, the adjustment being shown as effected by enlarging the bolt holes 305a in Fig. 17. Intermediate of its length the lever 306 is connected by a link 308 with an arm 309 carried by a sleeve 310 rotatably mounted on a vertical shaft 311 extending upwardly from a bracket mounted on the rear of the plate 15. The arm 309 is provided with a roller which is arranged to engage a cam plate 6o. The collar has a second arm 312 connected by the spring 313 with the plate 15. Thus the contact of the roller with the cam plate tends to swing the edge of the tool 305 into contact with the neck of the parison during its elongation due to gravity and the puff blowing as above described, and after the roller has passed from contact with the cam plate, the tool 305 is retracted out of the way by the spring 313, the spring also serving to urged the roller at all times toward the cam plate.

*The reheating burner and its operation*
*(Figs. 1, 2 and 17)*

Means are provided for reheating and controlling the shape of the parison while it is suspended from the neck ring after the removal of the parison from the parison mold.

Thus 314 represents a lever pivotally mounted on the pin 307 and having its free end provided with a depending shelf 315 which carries a burner 316 to which a combustible fluid, such as a mixture of gas and air, is supplied by any convenient means. Intermediate of its ends the lever 314 is connected by a link 317 to an arm 318 mounted on a collar 319 rotatably mounted on the shaft 311. The arm 318 is provided with a roller which engages a cam plate 6p. The engagement of the cam plate by the roller causes the burner to be swung under the naked parison suspended from the neck ring, thus reheating the parison and also controlling its elongation by gravity. The collar 319 is provided with a second arm connected by a spring 320 with the plate 15, so that as the roller passes beyond the cam plate, the burner is retracted out of the way.

In the operation of the machine, as illustrated diagrammatically in Fig. 20 of the drawings, the units travel clockwise and continuously about the axis of the machine and successively pass the gathering zone with the suction parison mold inverted and extending downwardly through the corresponding aperture 99 in the apron 97, the lids 88 being in their closed position as shown in Figs. 3 and 4.

As the mold passes over the glass container the lid dips into the glass and suction is applied which draws a charge of glass into the cavity formed by the mold and the lid. The parison mold is then elevated somewhat and the mold charge is severed from the supply of glass by the shears. The ascent of the parison mold continues and it is reverted by the rack 87 and positively positioned below and in engagement with one of the neck rings. The press head with its pressing plunger 220 in its lowermost position, now descends and presses the gathered glass and forces the now upper portion of it into the neck ring.

It is to be noted that each gathering operation provides a charge consisting of two portions, the first, marked 321, Fig. 3, is within the parison mold proper, and the second, marked 322, is that laterally defined by the opening in the lid.

In the use of my machine in the manufacture of electric light bulbs, tumblers and the like, the first of these portions, 321, is destined to form the ultimate article, while the second portion, 322, forms a neck or connection useful during the formation of the article but ultimately cracked off or otherwise detached, forming no part of the ultimate article. It is this second portion 322 only which is disturbed appreciably by the pressing operation, it being forced by the pressing plunger into the space between the plunger and the edges of the neck ring. The first or body portion, 321, of the charge while compacted to some extent by the pressing operation is not normally displaced to an extent which will cause appreciable relative movement between its outer surface and the interior wall of the parison mold proper. It is readily seen that these provisions and this mode of operation permits accurate control of the extent and character of chilling of the body portion of the parison. This chilling is thus rendered uniform and results in a final article in which the distribution of glass is superior to that generally obtained with machines of the prior art.

This method of operation is peculiarly adapted to the formation of electric light bulbs and similar articles, tumblers and the like. It is obvious that the neck ring may be employed to form the "finish" which may be a permanent part of the completed article as when my inventions are employed in the manufacture of bottles.

After the pressing operation the parison mold descends and is again inverted preparatory to receiving its next mold charge, leaving the naked parison suspended from the neck ring. Thereafter the parison while suspended from the neck ring is shaped to suit the conformation of the blow mold.

The details of the shaping operations are subject to variation in accordance with the articles to be made, and may comprise puff-blowing and elongation by gravity, reheating and shaping by the dynamic force of the heating burner, spinning, and/or necking by the use of the tool shown at 305. Methods which may be employed are fully described in my patent applications, Serial No. 31,315, filed May 19, 1925, now Patent No. 1,756,813 issued April 29, 1930, and Serial No. 320,109, filed November 17, 1928.

During such parison shaping operations the neck ring and parison may be spun by means of the frictional engagement between the ring and the rotating press head. The pressing plunger is of course retracted within the press head after the pressing operation and the puff and other blowing which may be employed to assist in shaping the parison supplied through the head by means already described.

When the parison has been suitably shaped the neck ring carrier is rotated 180° in a clockwise direction to bring the neck ring from which the parison is suspended into suitable relation with the blow mold which is now moved into position and closed about the parison. The blow head now descends into engagement with the neck ring and the parison is blown to final form in the blow mold, the intermittent rotation of the blow head causing relative movement between the parison and the blow mold as the former is being expanded in the latter. The blow head is now raised and the blow mold is opened and swung to one side, leaving the finished article suspended from the neck ring.

The neck ring platform is then rotated 180° in a clockwise direction to carry the neck ring in question back to its parison forming position. As the neck ring passes under the roller 200 the latter by its engagement with the cam track 199 of the cover 197 opens the neck ring and releases the finished article which is carried away by suitable means not shown.

The above described operation of the device proceeds during two complete rotations of the unit in question about the axis of the machine. During the one complete rotation the parison is gathered and shaped and during the next rotation that parison is blown to final form and is removed from the blow mold. During the second rotation the other neck ring receives a charge as above described, which charge is pressed and shaped into a parison and made ready to be transferred for its final blowing operation at the end of the second rotation. By this arrangement of parts and method of operation the rate of production of machines of this character is greatly increased, as is obvious from the cycle above described.

It is to be observed that each suction parison mold 45 travels in a circular path of materially shorter diameter than does the corresponding blow mold 124. This difference in path diameters may be emphasized by rearrangement of the structure. In the arrangement shown the linear speed of movement of the suction mold is materially less than that of the blow mold. This arrangement presents peculiar and novel advantages over the prior art in that it permits the machine to be operated at greatly increased speed while assuring ample time for the suction gathering operation.

The cycle above described and illustrated in Fig. 20 may be varied in many respects as to the time employed in the several operations and my invention is not to be limited to the particular cycle there shown. Obviously the particular mechanisms illustrated and described may be modified and the mechanisms disclosed in the said patent applications of Canfield and in the prior art may be substituted in the combination of structure and the practice of method of the invention.

The gathering pool
(Figs. 1, 2, 3, 20, 21, 22 and 23)

The glass melting furnace 96 is provided with a forwardly extending portion 323 which may be relatively shallow and in which the molten glass is at the same level as in the furnace 96. Parallel with the front wall 324 of the extension 323 and spaced inwardly therefrom is a wall 325 which forms the back wall of the gathering pool 326. At either end of the back wall 325, and between said wall and corresponding side wall of the extension, are openings or ports as at 327 and 328, through which molten glass may flow into or from the gathering pool, and from or back into the furnace, and a division wall 329 extends from the center of the back wall 325 toward the furnace to provide parallel passages 330 and 331 from the flow of the glass in opposite directions.

The front wall 332 of the furnace 96 is arched to provide the opening for the molten glass between the furnace and the extension 323 and the lower edge of said arched wall is preferably extended down below the top level of the glass to prevent dissipation of the furnace heat and also to skim the glass which is supplied to the gathering pool.

It is evident that as the parison molds or other suction-gathering receptacles are dipped into the gathering pool and are caused to travel in suction relation with the molten glass in a direction which is clockwise in Fig. 2 and as indicated by the arrow in Fig. 21, a current will be produced in the pool, fresh, hot glass being caused to flow from the furnace and through the port 327 into one end of the pool while the colder glass will flow out of the other end of the pool through the port 328 and back into the furnace to be reheated.

The front wall 324 and the back wall 325 are curved so that the gathering pool will conform to the arc of movement of the gathering receptacle.

333 represents a bridge which spans the gathering pool adjacent to the end thereof in the direction of the travel of the suction-feed receptacles, the top of the bridge being above the surface of the glass in the pool but low enough to be cleared by the molds or receptacles as they are raised just prior to the cutting of the neck of glass by the shears. Preferably the bridge extends only a short distance down into the glass so as not to materially interfere with the current of the glass in the pool.

In Fig. 21 is illustrated an inverted parison mold traveling in the direction of the arrow and into which a charge of glass has been sucked and the mold has begun to move upwardly. At 333a I indicate the tail of glass which connects the glass in the parison mold with the body of glass in the pool. The shears close and the cut is made just as the mouth of the mold has passed over the bridge 333, so that the severed tail, which is more or less chilled, falls down into that portion of the gathering pool which is adjacent to the outflow port 328 and thus the chilled tails are carried back into the furnace by the current produced in the glass by the suction receptacles or otherwise. The threads which form the connections between these sheared tails and the glass in the pool are deposited on the bridge 333 where they are quickly melted by the heat. The sheared tail which has dropped down into the gathering pool is indicated at 333b in Fig. 21.

A roof 334 extends from the front wall 332 of the furnace 96 over the extension 323 covering all of the same but the gathering pool, the front portion of said roof being inclined downwardly into proximity with the back wall of the gathering pool.

The apron 97 which travels with the machine extends over the top of the pool and in close proximity thereto, the perimetral edge of the apron being close to the front edge of the roof and preferably extending beneath an undercut portion of the latter as shown in Fig. 22. The front edge of the roof is curved to conform to the perimetral edge of the apron.

The extension is provided with means for maintaining the glass in the gathering pool at the proper temperature. Thus fluid fuel burners 335 may be directed through suitable ports in the roof toward the glass in the extension passages.

Inasmuch as the apertures 99 in the apron 97, through which the inverted suction-gathering receptacles protrude downwardly to obtain their charges of molten glass, are occupied by the lower portion of the receptacles as such apertures pass over the pool, the pool is efficiently closed over and thus the dissipation of the heat of the glass in the pool is prevented.

The pool structure and its enclosure form an important improvement in the art. The problem of maintaining a supply of glass at proper temperature and condition for suction feeding presents great difficulties but the same is fully met by the present invention.

*Modified forms of suction parison mold and assembly*

(*Figs. 24, 25, 26, 27, 28 and 29*)

These views illustrate one of the modifications, disclosing the parison mold and cooperating parts, the structure being as follows.

A bracket 336 is bolted to the turret 7 and extends outwardly therefrom. Attached to the base of said bracket and arranged to swing on a horizontal axis is a frame comprising the parallel bars 337 provided, respectively, at their outer ends with the partible sleeve bearings 338 and 339. The bars are connected intermediate their ends by a cross brace 340. The frame also carries a housing 341 in which is mounted a roller 342 running on the cam track 27 to effect the raising and lowering of the frame at the proper intervals.

The mold carrier 343 is provided with the two diametrically opposed trunnions 344 and 345 which are journaled in the bearings 338 and 339, respectively, (Fig. 27) thus supporting the mold-carrier so that it may be inverted and reverted on a horizontal axis.

A cylindrical sleeve 346 extends into the cylindrical bore of the carrier 343 from one end thereof, the upper end when it is inverted as illustrated in Fig. 27, and said sleeve is fixed relative to the carrier by means of bolts 347 which extend down through holes in the head of the sleeve, which overlaps the end of the carrier, and which bolts are screwed into threaded holes in the end of the carrier.

348 represents a cylindrical stem which is mounted in the bore of the sleeve 346 and has a threaded portion 349 which is in screw engagement with an interiorly threaded portion of the sleeve. The outer end of the stem protrudes from the sleeve and has a lock nut 350 screwed thereon against the head of the sleeve.

The inner end of the stem 348 extends beyond the sleeve 346 and is enlarged and provided with an annular shoulder 351 and an exteriorly threaded end.

The tubular mold-holder 352 is screwed onto the inner threaded end of the stem. The holder 352 bears against an internal flange 343a at the end of the carrier.

The mold 353 is mounted in the outer end of the holder 252 and is prevented from outward movement relative to the holder by the inwardly flanged outer end of the holder.

A rod 354 is connected to the inner end of the mold and extends inwardly within the central bore 355 of the stem 348. An abutment bolt 356 is screwed into the threaded outer end of the bore 355 against the end of the rod 354 to hold the mold against the end flange of the holder, and a lock nut 357 is screwed up on the bolt against the outer end of the stem 348.

It is evident that the molds are interchangeable in the holder to accommodate the parison mold to the gathering of mold charges suitable for various shapes and sizes of ware.

358 represents the annular lid which is employed to reduce the suction opening of the parison mold when the mold is inverted for the feeding operation.

The inner surface of the lid is recessed so as to fit against the ends of the carrier, the holder and the mold and has a central or axial opening for the admission of the glass.

The lid is provided with the hinge arm 359 which is keyed or otherwise fixed on the shaft 360 which is journaled in sleeve bearings 361 extending from the mold-carrier. The end of the shaft 360 is provided with a radially disposed lever 362 provided at its end with a roller 363 engaging a channel cam track 364 which is mounted on one of the bars 337. The track is so arranged that as the mold is raised and reverted, the lid 358 is swung aside from the mold as illustrated in Fig. 24 and in solid lines in Fig. 25, but as the mold is lowered and inverted the lid is swung into position at the mouth of the mold, as illustrated in Figs. 26 and 27 and in dotted lines in Fig. 25.

The trunnion 344 is tubular and has keyed or otherwise fixed therein the end of a shaft 365 which is provided outside of the trunnion with a circumferentially disposed shoulder 366 which limits the insertion of the shaft into the trunnion.

Against the outer side of the shoulder 366 a pinion 367 is keyed on the shaft 365, and said pinion may be further held against movement independently of the movement relative to the mold-carrier as by means of screws 368 extending through holes in the pinion and screwed into threaded holes in the end of the trunnion 344.

A segmental gear 369 is pivoted at 370 on the second bar 337, and is in mesh with the pinion 367. The angular tail of the segmental gear is provided with a roller 371 which engages a channel cam-track 372 which is bolted onto the outer end of the bracket 336, and is so formed that as the mold is elevated the travel of the roller in the track causes the inverted mold to be reverted and likewise as the mold is lowered the reverted mold is inverted.

The bearing 339 has bolted onto its outer face a valve block 373 which is chambered as at 374 and is provided with a threaded port 375, leading from the chamber 374 and to which is connected the pipe 376 which pipe is provided with a flexible portion. The other end of the pipe 376 is connected to the supply of partial vacuum, such for instance as the vacuum manifold 74 of the turret 7, (Fig. 1).

The block 373 is provided with a packing gland 377 which forms an air-tight seal between it and the trunnion 345. The chamber 374 communicates with a chamber 378 in the end of the trunnion 345 and there is provided a valve seat 379 formed in the block 373, and a valve 380 for closing said seat, said valve being resiliently held in and returned to its closed position by means of a spring 381 coiled about its stem 382 which protrudes through a packed hole in the block 373.

The chamber 378 is connected by the passages 383 to the vertical passages 384 in the wall of the carrier 343, the upper ends of which passages are closed, as by the head of the sleeve 346, while their lower ends are connected by ports 385 with an annular recess 386 formed between the inner wall of the carrier and the mold holder and closed at the end of the carrier by the flange 343a. It is obvious that with the valve open and the suction thus applied about the mouth of the mold, the glass will be sucked up through the central aperture of the lid and fill the mold.

Means are provided for opening the valve at the proper intervals and holding it open for the proper periods of time.

Thus 387 is a bell crank lever pivotally mounted at its angle on a bracket 388 extending from the block 373, the lever 387 having one leg bearing against the outer end of the valve stem 382. The other end of the lever 387 is connected by a link 389 to the upper end of a rocking lever 390 pivoted intermediate its ends to one of the bars 337 to swing on a horizontal axis. The lower end of the lever 390 is provided with a roller 391 which at the proper time as the unit rotates around the axis of the machine engages a cam block 392 on the outer side of the support of the cam track 27, thus swinging the bell crank lever and forcing the valve open and holding it open until the roller passes beyond the cam block, whereby the spring again closes the valve. The period during which the valve is open is timed to occur while the parison mold is depressed into suction relation with the glass in the gathering pool.

The outer end of the shaft 365 has rotatably mounted thereon the block 393, as by means of the pin 394 driven through a hole in the block and engaging a groove cut around the shaft. The escape of fluid along the shaft is prevented by the circular sealing cap 395 and a packing ring 396.

The bore of the block is provided with a pair of annular grooves 397 and 398 and these grooves are connected to the exterior of the block by ports 399 and 400, respectively, the outer portions of which are threaded. The pipes 401 and 402, for a circulation of water or other cooling fluid, are connected to these ports.

The shaft 365 is provided with a pair of parallel passages 403 and 404, the passages 403 being in constant communication with the groove 397 by means of a radial port in the wall of the shaft, and similarly a radial port connects the passage 404 with the groove 398.

At their inner ends the passages 403 and 404 are connected by radial ports with the passages 405 and 406, respectively, cut in the wall of the carrier 343.

A passage 406 in the carrier 343, communicates with an L shaped passage 420, in the sleeve member 346, the ends of the two passages forming the L, being plugged.

A radial bore 421, communicates between the vertical leg of the L passage 420, and an annular groove 422, formed in the cylindrical stem 348. This groove 422, communicates with the space 424, between the mold and the enlarged head 351, of the cylindrical stem 348, by an L shaped passage 423.

This space 424, communicates with an annular chamber 425, through a second L shaped passage 426, and the chamber in turn communicates with the upper end of the passage 406, through a radial bore 427.

*(Figs. 30 and 31)*

In these views I show another modified form of parison mold assembly wherein the mold holder is a ring 407 which has a differential bore and bears outwardly against the end flange 343a of the carrier 343.

The outer end of the mold 353a is exteriorly threaded to be screwed into said holder ring against the internal shoulder thereof.

The inner end of the mold is provided with a central opening in which is fitted the metal bushing 408 having a valve seat 409 at its end within the mold. A valve 410 on the end of a stem 411 is arranged to close said seat by movement upwardly in Fig. 30 which shows the mold inverted. The drop or opening movement of the valve is adjustably limited by lock nuts 412 screwed on the stem and arranged to engage the end of the bushing. An abutment bolt 413 has threaded engagement with a central opening in the cap 414 which is bolted onto the end of the carrier. The inner end of said bolt is enlarged and cylindrical and loosely surrounds the end of the valve stem 411 and the nuts 412 and bears against the bushing 408. It is evident that by adjusting the bolt 413 relative to the cap 414, the mold is removably clamped in position, and also that molds of different lengths and shapes may be employed.

The bolt is provided with longitudinal passages 415 which connect the interior of its cylindrical inner portion with a chamber 416, cut in the inner face of the cap 414 which chamber is connected by passages 417 in the cap and the carrier with the chamber 378 to which the valve 380 applies suction as described above.

The valve 410 is held open by gravity during the suction feed operation until the molten glass, rising in the mold, pushes the valve shut and thus cuts off the suction from the mold.

One of the water passages in the shaft 365, such as passage 403, has a pipe 418 which extends within the carrier to a point near the holder ring while the inner end of the other passage in the shaft, 404, may be open to the interior of the carrier.

Thus a circulation of a cooling medium is maintained in the interior of the carrier.

What I desire to claim is:—

1. In glass fabricating mechanism, a glass melting furnace, a gathering pool connected with said furnace to permit a travel of glass from the furnace into one end of the pool and from the other end of the pool back into the furnace, a bridge extending across the pool adjacent to the outlet end of the latter, a suction-gathering receptacle arranged to travel from the inlet end of the pool toward the outlet end of the pool and to gather a mold charge of molten glass therefrom, and means to cut the tail of glass connecting the charge in the receptacle with the glass in the pool after the receptacle has passed over the bridge, whereby the chilled tail is dropped into the pool adjacent to its outlet.

2. In glass fabricating mechanism, a glass melting furnace, a gathering pool connected with said furnace to permit a travel of glass from the furnace into one end of the pool and from the other end of the pool back into the furnace, a bridge extending across the pool adjacent to the outlet end of the latter, a suction-gathering receptacle arranged to travel from the inlet end of the pool toward the outlet end of the pool and to gather a mold charge of molten glass therefrom, means to cut the tail of glass connecting the charge in the receptacle with the glass in the pool after the receptacle has passed over the bridge, whereby the chilled tail is dropped into the pool adjacent to its outlet, and means for maintaining a sufficiently high temperature in said pool to melt the thread of glass deposited on said bridge.

3. In a machine for forming articles of glass, the combination of a rotary support, a suction-gathering parison mold and a finishing mold associated on said support, means for transferring the parisons from the parison mold to the finishing mold, and means for inverting and lowering the parison mold to gather a charge of molten glass therein, the gathering position of the parison mold being inside the circle of the path of movement of the finishing mold.

4. In a machine for forming articles of glass, the combination of a rotary support, a plurality of press and blow units carried by the support and comprising a suction-gathering receptacle and a blow mold, and means for inverting and lowering the gathering receptacle for the gathering oprations, the gathering receptacle moving with the support in a circular path inside of the circle defined by the path of movement of the blow molds.

5. In a machine for forming articles of glass, the combination of a continuously rotated support, a plurality of press and blow units carried by the support and each comprising a suction-gathering press mold and a finishing mold, means for lowering each of the press molds in turn to gather a charge of molten glass therein, means to press said charge in said press mold, means to transfer the pressed charge to said finishing mold, and means to blow the pressed charge to final form in said finishing mold, the press molds when in their gathering position being located within the area defined by the path of movement of the finishing molds, whereby the gathering press molds are given a relatively low translatory movement to give the maximum time for gathering in a pool of a given size.

6. In an automatic machine for forming glassware, the combination of a support, a suction-gathering mold carried on said support, means for inverting and lowering said mold for the gathering operation and for thereafter reverting and raising the mold, additional means effective automatically in response to the movement of the mold into its lowermost position for positively positioning the mold when inverted for the gathering operation, means cooperating with said mold after it has been reverted and raised for shaping the charge of glass therein, and further means effective automatically as a result of the movement of the mold for positively positioning the mold when reverted and raised to its uppermost position for the charge shaping operation.

7. In a machine for forming glassware, the combination of a rotatable support, a suction-gathering receptacle carried by said support and mounted for inversion with respect thereto on an axis tangent to a circle, the center of which is the axis of rotation of said support, means for inverting said receptacle about said tangent axis to gather a charge of glass therein from the upper surface of a glass supply and for thereafter reverting said receptacle, and constantly upright downwardly acting means for shaping a charge of glass gathered in said receptacle after the latter has been reverted from its gathering position.

8. In a machine for forming glassware, the combination of a support rotatable on a vertical axis, a suction-gathering receptacle mounted on said support for inversion about an axis tangent to a circle, the center of which is on the first-named axis, and also mounted for raising and lowering movement with respect to said support, means for lowering and raising said receptacle to and from its gathering position, means actuated by the lowering and raising movement of the receptacle for inverting it in a zone intermediate and spaced from the ends of the path of the lowering and raising movement, and means for shaping a charge of glass gathered in said receptacle after it has been raised and reverted from its gathering position.

9. In a machine for forming glassware, the combination of a rotatable support, a suction-gathering press mold carried by said support and mounted for substantially vertical movement and also for inverting movement with respect thereto, the latter about an axis radial of said support, means for lowering and raising said mold to and from suction-gathering position, means actuated by and operable in a zone intermediate and spaced from the ends of the path of the lowering and raising movement of said receptacle for inverting and reverting it, and means for pressing a charge of glass gathered in said mold after it has been raised and reverted from its gathering position.

10. In a glass fabricating mechanism, a glass melting furnace, a forehearth adapted to receive glass from said furnace and having an open top suction-gathering pool adjacent to its periphery at a point remote from said furnace, a support continuously rotated on a vertical axis adjacent to said forehearth, a suction-gathering receptacle mounted on said support and adapted to dip into said pool at a predetermined zone in its rotation to gather a charge of glass therefrom and to cause a circulation of the glass in said forehearth, a division wall positioned centrally in said forehearth about which glass may circulate, a bridge extending from said division wall to the outer wall of said forehearth substantially at the glass level so as not to interfere with the circulation of glass in said forehearth, said bridge being arranged transversely of the path of said receptacle across the pool, means to gather a charge of glass in said receptacle from the pool at one side of said bridge, and means to cut the tail of glass connecting the charge in the receptacle with the glass in the pool after the receptacle has passed over the bridge, whereby the chilled tail is dropped into the pool on the opposite side of said bridge from that where the glass was gathered and is thereby prevented from moving back into the gathering zone of the pool.

11. Apparatus for forming hollow glass articles by the suction-gathering process, comprising a blank mold, a blow mold, means to gather a charge of glass by suction in said blank mold, means thereafter cooperating with said blank mold for forming a blank therein, means to transfer said blank to said blow mold, means to blow said blank to final form in said blow mold, and means for continuously rotating both molds at the same angular velocity but at different linear speeds, the linear speed of said blank mold being less than that of said blow mold.

12. In an automatic machine for forming glassware, the combination of a support, a suction-gathering mold mounted on said support, means for inverting and lowering said mold for the gathering operation and for thereafter reverting and raising the mold, means cooperating with the reverted and raised mold for shaping a charge of glass therein, and additional means effective automatically in response to the movement of the mold into inverted and raised position for positively holding said mold against inversion while in position for the charge shaping operation.

13. In a machine for forming glassware, the combination of a support, a suction-gathering press mold mounted on said support, means for inverting and lowering the mold for the gathering operation and for thereafter reverting and raising the mold, a neck ring independent of said mold and cooperable therewith in its reverted and raised position, a pressing plunger adapted to press and gather the glass in said mold and neck ring, a flattened member invertible with said mold, and a stationary guide coacting with said flattened member in the position of said mold in cooperation with said neck ring for positively retaining said mold against inversion during the pressing operation.

14. Apparatus for forming hollow glassware, comprising a support, a suction-gathering press mold mounted on said support and movable with respect thereto into suction-gathering relation with a pool of molten glass, means for gathering a charge of glass by suction in said press mold, means for shearing the thread of glass connecting the gathered charge with the glass in the pool, a neck ring mounted on said support and independent of said mold, means for moving said press mold into cooperative relation with said neck ring, a constantly upright pressing plunger mounted on said support independently of said neck ring, means for moving said plunger to press the charge of glass in said mold and neck ring, means for thereafter removing said mold from about the pressed glass leaving it supported by said neck ring, and means for blowing the pressed glass to hollow form while supported by said neck ring.

15. Apparatus for forming glassware, comprising a support, a suction-gathering mold carried by said support and movable with respect thereto, a two-part lid for constricting the open end of said mold to assist in the suction-gathering of a charge of glass thereby and in the retaining of said charge in the mold, means for inverting and lowering said mold to gather a charge of glass therein and for thereafter reverting and raising said mold, means for opening the two-part lid actuated by the reverting and raising movement of the mold, charge shaping means cooperable with said mold in its reverted and raised position for shaping the glass therein, and a cam for closing the two-part lid during and in response to said inverting and lowering movement of the mold for gathering the succeeding charge.

16. Apparatus for forming glassware, comprising a support, a suction-gathering mold carried by said support and movable with respect thereto, a one-piece lid pivotally connected to said mold and adapted to assist in the suction-gathering of a charge of glass therein and in the confining of said charge after the gathering operation has been completed, means for inverting and lowering said mold to gather a charge of glass therein and for thereafter reverting and raising said mold, means cooperating with the reverted and raised mold for shaping a charge of glass therein, and a cam for controlling the pivotal movements of said lid to move it out of cooperative relation with said mold when the latter approaches its position in cooperation with said charge shaping means and for moving said lid into cooperative relation with said mold as it approaches its charge-gathering position.

17. Apparatus for forming glass articles, comprising a support, a suction-gathering mold carried thereby and movable with respect thereto, means for inverting and lowering said mold to gather a charge of glass therein and for thereafter reverting and raising said mold, means cooperating with said mold in its reverted and raised position for shaping a charge of glass therein, and cooling channels formed in said mold having inlet and outlet passages communicating therewith, and means for mounting said mold on said support to provide for its raising and lowering movement and also for its inverting and reverting movement without interrupting the flow of cooling fluid through said channels.

18. Apparatus for forming glass articles, comprising a continuously rotating support, a pair of arms mounted thereon on parallel horizontal axes, a mold-carrying head pivotally connected to said arms on axes parallel to the first-named axes, a mold mounted in said head for inversion with respect thereto about a horizontal axis substantially radial of said support, a cam roller mounted on one of said arms, a stationary annular cam cooperating with said roller for moving said arm and said mold vertically, a pinion mounted for rotation with said mold, and a rack mounted on said support and cooperable with said pinion, whereby said cam imparts inverting movement to said mold during a selected part of and actuated by its vertical movement.

19. Apparatus for forming hollow glassware, comprising a continuously rotatable support, an arm mounted thereon on a horizontal axis tangent to a circle concentric with the axis of rotation of said support, a mold mounted on said arm for inversion about an axis parallel to the pivotal axis of said arm, a cam roller mounter on said arm, a cam disposed adjacent to said support and concentric with the axis of rotation thereof for raising and lowering said arm and thus the mold carried thereby, a gear mounted for rotation with said mold, a swinging rack member cooperable with said gear, and a cam and roller, one of which is mounted on said support and the other on said rack member, for swinging said rack and thus inverting said mold in response to the raising and lowering movements thereof.

Signed at Hartford, Conn., this 9th day of July, 1929.

ROBERT W. CANFIELD.